US012634473B2

(12) United States Patent
Yu et al.

(10) Patent No.: US 12,634,473 B2
(45) Date of Patent: May 19, 2026

(54) OVERLAPPED DECODER SIDE MOTION REFINEMENT

(71) Applicant: Telefonaktiebolaget LM Ericsson (publ), Stockholm (SE)

(72) Inventors: Ruoyang Yu, Stockholm (SE); Jacob Ström, Stockholm (SE); Kenneth Andersson, Gävle (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 18/559,503

(22) PCT Filed: Jun. 2, 2022

(86) PCT No.: PCT/SE2022/050532
§ 371 (c)(1),
(2) Date: Nov. 7, 2023

(87) PCT Pub. No.: WO2023/277756
PCT Pub. Date: Jan. 5, 2023

(65) Prior Publication Data
US 2024/0236332 A1     Jul. 11, 2024

Related U.S. Application Data

(60) Provisional application No. 63/216,577, filed on Jun. 30, 2021.

(51) Int. Cl.
*H04N 19/139*     (2014.01)
*H04N 19/117*     (2014.01)
(Continued)

(52) U.S. Cl.
CPC ......... *H04N 19/139* (2014.11); *H04N 19/117* (2014.11); *H04N 19/119* (2014.11);
(Continued)

(58) Field of Classification Search
CPC .. H04N 19/117; H04N 19/119; H04N 19/139; H04N 19/176; H04N 19/513; H04N 19/80
See application file for complete search history.

(56) References Cited

U.S. PATENT DOCUMENTS

| | | | |
|---|---|---|---|
| 10,701,366 B2 | 6/2020 | Chen et al. | |
| 11,825,117 B2 * | 11/2023 | Piao ..................... | H04N 19/423 |

(Continued)

FOREIGN PATENT DOCUMENTS

| | | |
|---|---|---|
| EP | 3 457 696 A1 | 3/2019 |
| WO | 2019/111835 A1 | 6/2019 |

(Continued)

OTHER PUBLICATIONS

International Search Report and Written Opinion issued in International Application No. PCT/SE2022/050532, dated Jun. 17, 2022 (16 pages).

(Continued)

*Primary Examiner* — Jeremiah C Hallenbeck-Huber
(74) *Attorney, Agent, or Firm* — Rothwell, Figg, Ernst & Manbeck, P.C.

(57) ABSTRACT

Methods and apparatus for encoding or decoding a first structure within a picture in a video sequence are provided. The method comprises, for a second structure within the first structure, determining an initial motion vector, MV, and MV candidates. The method comprises, for each of the MV candidates, using the MV candidate to derive first and second reference blocks, and a size of the first and second reference blocks may not be equal to a size of the second structure. The method comprises deriving a cost value based on samples from the first and second reference blocks. The method comprises using the cost values from the MV candidates to derive a best MV candidate and using the best (Continued)

MV candidate to derive prediction samples for the second structure.

19 Claims, 17 Drawing Sheets

(51) Int. Cl.

| | |
|---|---|
| *H04N 19/119* | (2014.01) |
| *H04N 19/176* | (2014.01) |
| *H04N 19/513* | (2014.01) |
| *H04N 19/80* | (2014.01) |

(52) U.S. Cl.
CPC ......... *H04N 19/176* (2014.11); *H04N 19/513* (2014.11); *H04N 19/80* (2014.11)

(56) References Cited

U.S. PATENT DOCUMENTS

| | | | |
|---|---|---|---|
| 2020/0007888 A1 | 1/2020 | Xu et al. | |
| 2020/0107015 A1 | 4/2020 | Seo et al. | |
| 2021/0185344 A1* | 6/2021 | Unno ................... | H04N 19/122 |
| 2022/0060690 A1* | 2/2022 | Sethuraman ......... | H04N 19/513 |
| 2022/0150507 A1* | 5/2022 | Lin ...................... | H04N 19/577 |
| 2022/0191502 A1* | 6/2022 | Chen ................... | H04N 19/176 |
| 2022/0368916 A1* | 11/2022 | Zhang ................. | H04N 19/176 |

FOREIGN PATENT DOCUMENTS

| | | |
|---|---|---|
| WO | 2020/169083 A1 | 8/2020 |
| WO | 2020/177696 A1 | 9/2020 |
| WO | 2020/177727 A1 | 9/2020 |
| WO | 2020/182216 A1 | 9/2020 |
| WO | 2020/211755 A1 | 10/2020 |

OTHER PUBLICATIONS

Yu, Ruoyang et al., "AHG10: Encoder MV selections and DMVR", Joint Video Experts Team (JVET) of ITU-T SG 16 WP 3 and ISO/IEC JTC 1/SC 29, Document: JVET-W0061v3, 23rd Meeting, by teleconference, Jul. 7-16, 2021, 6 pages.

Huang, Han et al., "EE2-related: Adaptive decoder side motion vector refinement", Joint Video Experts Team (JVET) of ITU-T SG 16 WP 3 and ISO/IEC JTC 1/SC 29, Document: JVET-W0107v2, 23rd Meeting, by teleconference, Jul. 7-16, 2021, 3 pages.

Extended European Search Report issued in European Application No. 22833757.2, dated Oct. 29, 2024 (10 pages).

Kuo, Tien-Ying et al., "Fast Overlapped Block Motion Compensation with Checkerboard Block Partitioning", IEEE Transactions on Circuits and Systems for Video Technology, vol. 8, No. 6, Oct. 1998 (8 pages).

\* cited by examiner

1100

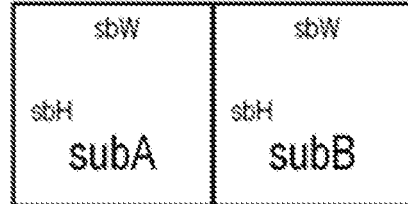
FIG. 15A
FIG. 15B
FIG. 15C
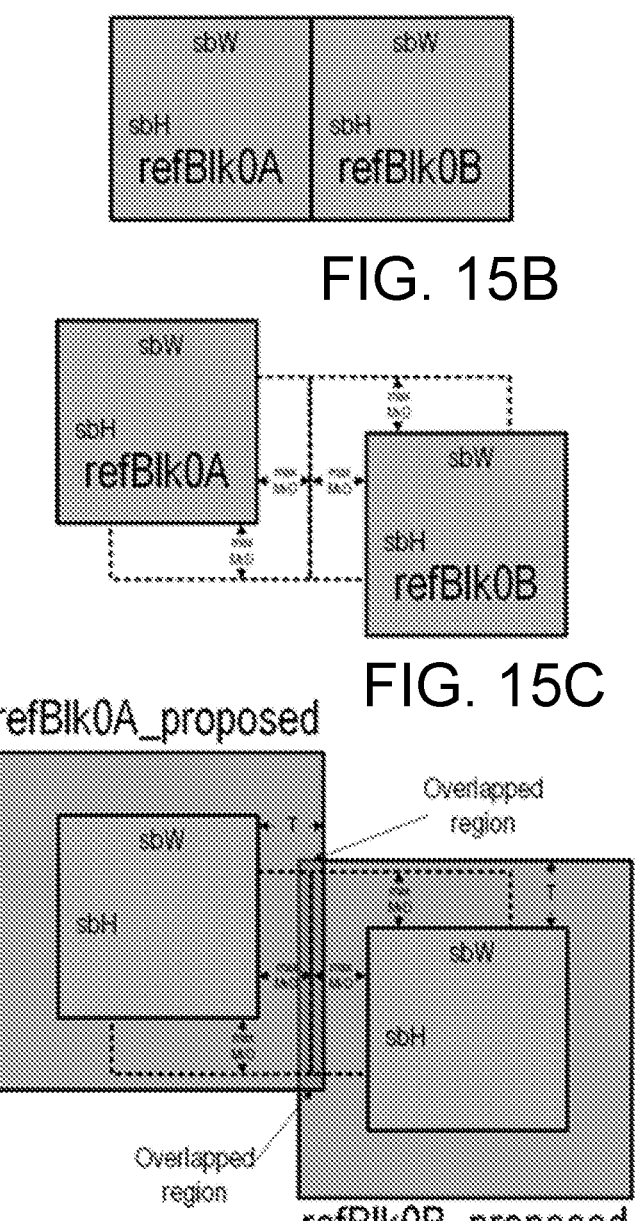
FIG. 15D

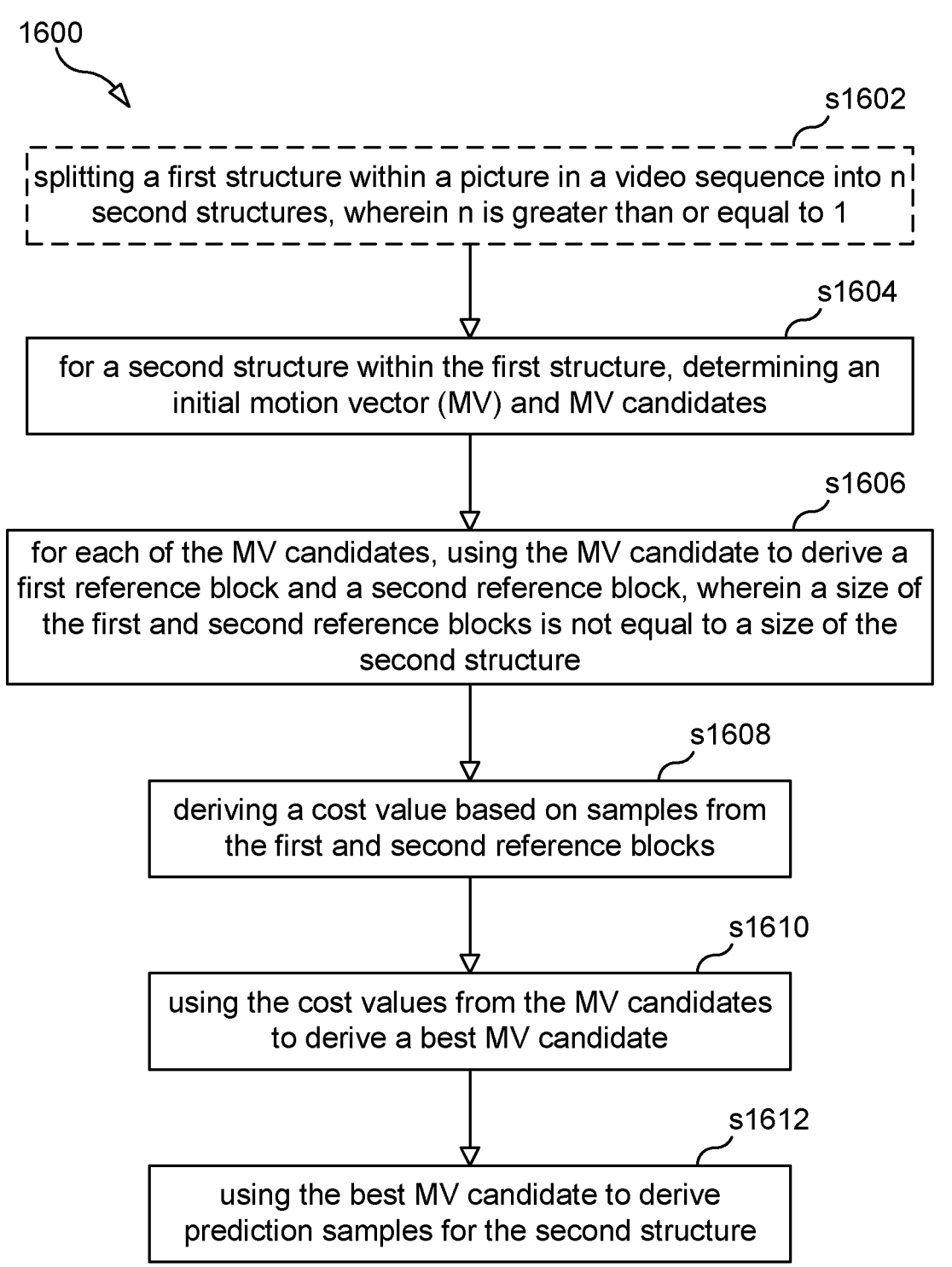

1600 s1602 splitting a first structure within a picture in a video sequence into n second structures, wherein n is greater than or equal to 1 s1604 for a second structure within the first structure, determining an initial motion vector (MV) and MV candidates s1606 for each of the MV candidates, using the MV candidate to derive a first reference block and a second reference block, wherein a size of the first and second reference blocks is not equal to a size of the second structure s1608 deriving a cost value based on samples from the first and second reference blocks s1610 using the cost values from the MV candidates to derive a best MV candidate s1612 using the best MV candidate to derive prediction samples for the second structure

FIG. 16

OVERLAPPED DECODER SIDE MOTION REFINEMENT

CROSS REFERENCE TO RELATED APPLICATION

This application is a 35 U.S.C. § 371 National Phase Entry Application from PCT/SE2022/050532, filed Jun. 2, 2022, designating the United States, which claims priority to U.S. provisional patent application No. 63/216,577, filed Jun. 30, 2021, the disclosures of which are incorporated herein by reference in their entireties.

TECHNICAL FIELD

This disclosure relates to video encoding and/or decoding of a picture or a video sequence.

BACKGROUND

Video and Picture

A video sequence consists of a series of pictures (also referred to as "images" herein). In the Versatile Video Coding (VVC) standard, each picture is identified with a picture order count (POC) value.

Components

Each component can be described as a two-dimensional rectangular array of sample values. It is common that each picture consists of three components: one luma component Y where the sample values are luma values and two chroma components Cb and Cr where the sample values are chroma values.

It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

Coding Unit and Coding Block

A block is one two-dimensional array of samples. In video coding, each component is split into blocks and the coded video bitstream consists of a series of coded blocks. It is common in video coding that pictures are split into units that cover a specific area of the picture.

Each unit consists of all blocks from all components that make up that specific area and each block belongs fully to one unit. The coding unit (CU) in VVC is an example of units. In VVC, the CUs may be split recursively to smaller CUs. The CU at the top level is referred to as the coding tree unit (CTU).

A CU usually contains three coding blocks, e.g., one coding block for luma and two coding blocks for chroma. The size of luma coding block is the same as the CU.

In the current VVC (i.e., version 1), the CUs can have size of 4×4 up to 128×128.

Intra Prediction

In intra prediction, also known as spatial prediction, a block is predicted using the previous decoded blocks within the same picture. The samples from the previously decoded blocks within the same picture are used to predict the samples inside the current block.

A picture consisting of only intra-predicted blocks is referred to as an intra picture.

Inter Prediction

In inter prediction, also known as temporal prediction, blocks of the current picture are predicted using blocks from previously decoded pictures. The samples from blocks in the previously decoded pictures are used to predict the samples of the current block.

A picture that allows inter-predicted block is referred to as an inter picture. The previous decoded pictures used for inter prediction are referred to as reference pictures.

The location of the referenced block inside the reference picture is indicated using a motion vector (MV). Each MV consists of x and y components which represents the displacements between current block and the referenced block in x or y dimension. The value of a component may have a resolution finer than an integer position. When that is the case, a filtering (typically interpolation) is done to calculate values used for prediction. FIG. 1 shows an example of a MV for the current block C. In the example, the MV=(2,1) indicates that the referenced block can be found two steps to the right and one step down compared to the position of the current block.

An inter picture may use several reference pictures. The reference pictures are usually put into two reference picture lists, L0 and L1. The reference pictures that are output before the current picture are typically the first pictures in L0. The reference pictures that are output after the current picture are typically the first pictures in L1.

Inter predicted blocks can use one of two prediction types, uni- and bi-prediction. Uni-predicted block predicts from one reference picture, either using L0 or L1. Bi-prediction predicts from two reference pictures, one from L0 and the other from L1. FIG. 2 shows an example of the prediction types.

Fractional MVs, Interpolation Filter, and MV Rounding

The value of the MV's x or y component may corresponds to a sample position that has finer granularity than integer (sample) position. Those positions are also referred to as fractional (sample) positions.

In VVC, the MV can be at $\frac{1}{16}$ sample position. FIG. 3 depicts several fractional positions in the horizontal (x-) dimension. The solid-square blocks represent integer positions. The circles represent $\frac{1}{16}$-position. For example, MV= (4, 10) means the x component is at $\frac{4}{16}$ position, the y component is at $\frac{10}{16}$ position.

In video coding, a MV rounding process is sometimes used to convert a MV at one position to another target position. One example of rounding is to round a fractional MV position to the nearest integer position.

When a MV is at a fractional position, filtering (typically interpolation) is done to calculate the sample values at those positions. In VVC, the length (number of filter taps) of the interpolation filter for luma component is 8, as shown in Table 1 below.

TABLE 1

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |

TABLE 1-continued

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Residual, Transform, and Quantization

The difference between samples of a source block (which contains original samples) and samples of the prediction block, is often called 'residual block'. This residual block is then typically compressed by a spatial transform to remove further redundancy. The transform coefficients are then quantized by a quantization parameter (QP) to control the fidelity of the residual block and thus also the bitrate required to compress the block. A coded block flag (CBF) is used to indicate if there are any non-zero quantized transform coefficients. All coding parameters are then entropy coded at the encoder and decoded at the decoder. A reconstructed block can then be derived by inverse quantization and inverse transformation of the quantized transform coefficients if the coded block flag is one and then add that to the prediction block.

Hierarchical Picture Coding Structure

In what is often referred to as the 'random access configuration', intra coded pictures are positioned with a fixed interval (e.g., every second). Pictures between the intra picture are typically coded with a bi-directional group of pictures (B-GOP) structure as shown in FIG. 4. In the example shown in FIG. 4, picture 0 is coded first and then picture 8 is coded using picture 0 as its reference picture. Then, picture 8 and picture 0 are used as reference pictures to code picture 4. Then, similarly, picture 2 and picture 6 are coded. Finally, pictures 1, 3, 5, and 7 are coded.

Pictures 1, 3, 5, and 7 are referred to as being on the highest hierarchical level, pictures 2, 4, and 6 are referred to as being on the next highest hierarchical level, picture 4 is referred to as being on next lowest level, and picture 8 is referred to as being on the lowest level. Typically, pictures 1, 3, 5, and 7 are not used as reference pictures for any other pictures. They are called non-reference pictures.

The assigned QP for each picture are usually different and are set according to the hierarchy level. Higher QP is assigned for pictures that at higher hierarchy level.

Inter Prediction/Motion Information

For an inter block in an inter picture in VVC, the inter prediction information of the inter block consists of the following three elements: (1) a reference picture list flag (RefPicListFlag), (2) a reference picture index (RefPicIdx) per reference picture list used, and (3) a motion vector (MV) per reference picture used. A reference picture list flag (RefPicListFlag) signals which reference picture list is used. When the value of RefPicListFlag is equal to 0, L0 is used. When the value of RefPicListFlag is equal to 1, L1 is used. When the value of RefPicListFlag is equal to 2, both L0 and L1 are used. The reference picture index (RefPicIdx) signals which reference picture inside the reference list is to be used.

The motion vector (MV) signals the position inside the reference picture that is used for predicting the current block.

The inter prediction information is also referred to as motion information. The decoder stores the motion information for each inter block. In other words, an inter block maintains its own motion information.

Encoder Decision and Rate Distortion (RD) Ccost

In practice, for an encoder to decide the best prediction mode for a current block, the encoder will evaluate many or all of the possible prediction modes for the current block and select the prediction mode that yields the smallest Rate-Distortion (RD) cost.

The RD cost is calculated as $D+\lambda*R$. The D (Distortion) measures the difference between the reconstructed block and the corresponding source block. One commonly used metric for calculating D is the sum of squared difference $SSE=\Sigma_{x,y} (P_A(x, y)-P_B(x, y))^2$, where the $P_A$ and $P_B$ are the sample values in the two block A and B respectively. The R (Rate) is usually an estimation of the number of bits to be spent on encoding the mode. The $\lambda$ is a trade-off parameter between R and D.

Motion Information Signaling

VVC includes several methods of implicit signaling motion information for each block, including the merge method and the subblock merge method. A common motivation behind the implicit methods is to inherit motion information from neighboring coded blocks.

Merge (Block Merge) Method

The merge method is similar to the one in the High Efficiency Video Coding (HEVC) standard. The method is sometimes referred to as the block merge method because the derived motion information is used for generating the samples of the entire block.

The method first generates a list of motion information candidates. The list is also referred to as the merge list. The candidates are derived from previously coded blocks. The blocks can be spatially adjacent neighboring blocks or temporal collocated blocks relative to the current block. FIG. 5 shows the spatial neighboring blocks: left (L), top(T), top-right(TR), left-bottom (LB), and top-left (TL).

After the merge list is generated, one of the candidates inside the list is used to derive the motion information of the current block. The candidate selection process is done on the encoder side. An encoder would select a best candidate from the list and encode an index (merge_index) in the bitstream to signal to a decoder. The decoder receives the index, follows the same merge list derivation process as the encoder, and uses the index to retrieve the correct candidate.

Explicit Motion Information Signaling

VVC also includes an explicit motion information signaling method called alternative motion vector prediction (AMVP). For a current inter block that is coded with AMVP, the number of reference pictures, reference picture indices, and motion vectors for the current inter block are explicitly signaled and encoded into the bitstream.

In general, the block merge method is a cheaper alternative compared to the explicit method in terms of number of bits spent on signaling of motion information, because only one index value (e.g., merge_idx) needs to be signaled. When encoding an inter block, an encoder may choose to encode a block in merge mode because the merge method gives the smaller rate distortion (RD) cost than the explicit method, even though the derived (e.g., inherited) motion information from neighboring inter blocks does not suit well for the current block. The relatively poor fit may in these situations may be compensated for by fact that the signaling cost is a lot cheaper. Still, improving fit without spending more bits would be beneficial.

Decoder-Side Motion Vector Refinement (DMVR)

VVC includes a tool called decoder-side motion vector refinement (DMVR) to further refine MVs for blocks coded in merge mode with bi-predictive MVs. DMVR attempts to improve the fit without spending more bits.

The DMVR refines the MVs on subblock basis. A first step is to split a current block into a group of subblocks. The current inter block has a width=W and a height=H. The width sbW of the subblocks is determined to be min(W, 16). The height sbH of the subblocks is determined to be min(H, 16). The min(,) function here takes the minimum of the two input values. The DMVR then carries out MV refinement for each of the subblock with size sbW×sbH. An example of 32×32 block with four 16×16 subblocks is shown in FIG. 6.

The initial MVs (e.g., the MVs to be refined) are derived using the merge method. As shown in FIG. 7, the initial MVs for the current block are assumed to be MV0 and MV1. In FIG. 7, the position in the corresponding reference picture is marked as squares. In FIG. 7, a search window is shown as circles. Each circle can be represented by an offset MVoffset to the initial MV position. For example, the hollow circle corresponds to an MVoffset=(−1, 1) to the initial position of MV0. This hollow circle corresponds to a new motion vector MV0'=MV0+MVoffset. A mirroring rule is followed for deriving the new motion vector MV1' (i.e. MV1'=MV1−Mvoffset).

In other words, any points inside the search window would result in a new MV pair (MV0', MV1'):

$$MV0' = MV0 + MV \text{ offset}$$

$$MV1' = MV1 - MV \text{ offset}$$

where MVoffset represents the offset between the initial MV and the refined MV in one of the reference pictures. In VVC, the maximum x or y component for MVoffset is set to be 2 integer samples.

DMVR searches all the MVoffsets within the search window and finds the MVoffset that gives the smallest difference (cost) between the L0 reference block and L1 reference block. The difference (cost) is calculated as the sum of absolute difference (SAD) between the two reference blocks, e.g., SAD=$\Sigma_{x,y}$|P0(x, y)−P1(x, y)|, where P0 and P1 are the two reference blocks.

FIG. 8 illustrates an example of initial MVs, MVoffset, and refined MVs. The refined MVs (derived from the best MVoffset) are used to generate prediction samples for the current block.

In VVC, there is no block level flag explicitly signaled for turning on/off DMVR. In other words, when the initial MVs are bi-predictive and some other conditions are met, the DMVR is applied implicitly.

SUMMARY

On problem with the existing decoder-side motion vector refinement (DMVR) scheme is that it refines the motion vector (MV) for each subblock independently. This may introduce inconsistencies to the refined MVs among the subblocks. The inconsistency here may result in large MV difference or large MV variation. As an example, the refined MVs for two adjacent subblocks could have a difference of 4 integer samples in x or y component. Such a big difference is very likely to result in noticeable subblock boundaries in the reconstructed pictures and lead to worse subjective quality.

FIGS. 9A and 9B show examples of problematic areas from reconstructed pictures coded with VVC Test Model 11 (VTM-11) (the VVC reference software) encoder. The areas correspond to blocks with DMVR applied. As shown in FIGS. 9A and 9B, the subblock boundaries can be clearly seen.

Aspects of the invention may overcome one or more of the problems with the existing DMVR scheme by, when subblock-based DMVR is applied for a current block, for each subblock inside the current block, extending the size of the reference blocks when calculating the cost (e.g., the difference between the two reference blocks). Increasing the reference block size may introduce an overlap between the reference blocks that are used for generating the refined MV of neighboring subblocks. Aspects of the invention may apply to both an encoder and a decoder.

Aspects of the invention may use reference blocks that have a size larger than the size of the current subblock during the decoder-side motion search. In some aspects, a maximum MV difference of MV search candidates and the initial MV may be taken into consideration when setting the extended size for the reference blocks. In some aspects, the extended size may be set to provide an overlapping region even when the reference blocks are furthest away from each other. The introduced overlapped region may help to increase the correlation or consistency between the final selected/refined MVs between two neighboring subblocks.

Aspects of the invention may increase the correlation or consistency of the refined MVs among neighboring subblocks. The increased correlation of the MVs may lower the risk of introducing noticeable subblock boundaries.

Aspects of the invention may additionally or alternatively reduce the risk of the refined MV being optimized towards a local minimum because more reference samples are considered. The refined MVs may be more likely to be more suitable for the respective areas. In other words, aspects of the invention may more often result in refined MVs that are close to the true motion in the scene (as compared to what the existing DMVR method does).

Aspects of the invention may be implemented in both the encoder and the decoder (e.g., of the VTM-11 software). FIGS. 10A and 10B show the pictures of FIGS. 9A and 9B, respectively, reconstructed according to aspects of the invention. As shown in FIGS. 10A and 10B, the pictures reconstructed according to aspects of the invention do not include the artificial subblock boundaries that FIGS. 9A and 9B did.

Table 2 shows the objective performance using overlapped decoder-side motion refinement in accordance with aspects of the invention. The numbers in Table 2 show the relative bit-cost using overlapped decoder-side motion refinement in accordance with aspects of the invention to achieve equivalent objective video quality (measured in peak signal-to-noise ratio (PSNR)) as VTM-11. The overall Bjontegaard delta rate (BD-rate or BDR) of −0.10% means the overlapped decoder-side motion refinement in accordance with aspects of the invention requires 0.10% less bits than VTM-11 to achieve the same objective video quality for the Y component. Subjective quality may additionally or alternatively be improved.

TABLE 2

| | Random Access Main10 Proposed Solution Over VTM-11.0 | | |
| --- | --- | --- | --- |
| | Y | U | V |
| Class A1 | −0.10% | −0.18% | −0.11% |
| Class A2 | −0.14% | −0.09% | −0.10% |
| Class B | −0.09% | −0.07% | 0.01% |
| Class C | −0.08% | −0.10% | 0.08% |
| Class E | | | |
| Overall | −0.10% | −0.10% | −0.02% |
| Class D | −0.02% | 0.11% | 0.11% |
| Class F | 0.01% | 0.02% | −0.01% |

One aspect of the invention may provide a method for processing (e.g., encoding or decoding) a first structure within a picture in a video sequence. The method may include, for a second structure within the first structure, determining an initial motion vector (MV) and MV candidates. The method may include, for each of the MV candidates, using the MV candidate to derive a first reference block and a second reference block. A size of the first and second reference blocks may not be equal to a size of the second structure. The method may include deriving a cost value based on samples from the first and second reference blocks. The method may include using the cost values from the MV candidates to derive a best MV candidate. The method may include using the best MV candidate to derive prediction samples for the second structure.

In some aspects, the first structure may be a block, and the second structure may be a subblock of the block. In some aspects, the method may further include splitting the block into n subblocks, and n may be greater than or equal to 1. In some aspects, an accumulated number of samples of the n subblocks may be equal to the number of samples of the block. In some aspects, n may be greater than or equal to 2.

In some aspects, the first structure may be a superblock containing two or more blocks, and the second structure may be a block of the superblock. In some aspects, the superblock may be a coding tree unit (CTU) or part of a CTU.

In some aspects, a height of the first and second reference blocks may not be equal to a height of the second structure, and/or a width of the first and second reference blocks may not be equal to a width of the second structure. In some aspects, a height of the first and second reference blocks may be greater than a height of the second structure, and/or a width of the first and second reference blocks may be greater than a width of the second structure.

In some aspects, using the MV candidate to derive the first and second reference blocks may include, for each of the first and second reference blocks, deriving first and second groups of reference samples based on the MV candidate. In some aspects, the first group of reference samples may be a block of reference samples having a width and a height equal to a width and a height, respectively, of the second structure.

In some aspects, the second group of reference samples may include the reference samples of the reference block that are not in the first group of reference samples.

In some aspects, the reference block may include P samples between a top boundary of the first group of reference samples and a top boundary of the reference block, Q samples between a bottom boundary of the first group of reference samples and a bottom boundary of the reference block, X samples between a left boundary of the first group of reference samples and a left boundary of the reference block, and Y samples between a right boundary of the first group of reference samples and a right boundary of the reference block. P, Q, X, and Y may be numbers, and at least one of P, Q, X, and Y may be a non-zero number.

In some aspects, P, Q, X, and Y may be greater than or equal to a threshold T that depends on a maximum MV difference in x or y component between the initial MV and the MV candidates. In some aspects, the threshold T may be greater than the maximum MV difference. In some aspects, the threshold T may be equal to two times the maximum MV difference. In some aspects, the threshold T may be equal to the maximum MV difference. In some aspects, the maximum MV difference may be 2 in integer sample, the threshold T may be 4, and P, Q, X, and Y may be equal to 4.

In some aspects, P, Q, X, and Y may be equal. In some aspects, one or more of P, Q, X, and Y may be different from another of P, Q, X, and Y. In some aspects, one or more of P, Q, X, and Y may correspond to a side of the second structure that is at a boundary of the first structure and is larger than another of P, Q, X, and Y that does not correspond to a side of the second structure that is at a boundary of the first structure.

In some aspects, deriving the first and second groups of reference samples based on the MV candidate may include using a first interpolation filter to derive the first group of reference samples and using a second interpolation filter to derive the second group of reference samples, and the first and second interpolation filters are different. In some aspects, the first interpolation filter may be longer than the second interpolation filter.

In some aspects, deriving the second group of reference samples based on the MV candidate may include using a rounded version of the MV candidate. In some aspects, the rounded version of the MV candidate may be the MV candidate rounded to an integer sample position.

In some aspects, the first reference block for the second structure may overlap a first reference block of another second structure of the first structure. In some aspects, the second reference block for the second structure may overlap a second reference block of the other second structure.

In some aspects, the first reference block for the second structure may touch but does not overlap a first reference block for another second structure of the first structure. In some aspects, the second reference block for the second structure may touch but does not overlap a second reference block for the other second structure.

In some aspects, the cost value may be derived as a sum of difference values between samples of the first and second reference blocks. In some aspects, the difference values may be absolute sample difference values. In some aspects, the difference values may be squared sample difference values.

In some aspects, the cost value may be derived as a sum of difference values between reference samples of the first and second reference blocks, and the difference values may include (a) difference values between a subset of the first group of reference samples of the first reference block and a subset of the first group of reference samples of the second reference block and/or (b) difference values between a subset of the second group of reference samples of the first reference block and a subset of the second group of reference samples of the second reference block. In some aspects, the cost value may be derived as a sum of difference values between reference samples of the first and second reference blocks, and the difference values may include (i) difference values between all reference samples of the first group of reference samples of the first reference block and all reference samples of the first group of reference samples of the second reference block and (ii) difference values between every other reference sample of the second group of reference samples of the first reference block and every other reference sample of the second group of reference samples of the second reference block. In some aspects, the cost value may be derived as a sum of difference values between reference samples of the first and second reference blocks, and the difference values may include (i) difference values between all reference samples of the first group of reference samples of the first reference block and all reference samples of the first group of reference samples of the second reference block and (ii) difference values between the spatially outermost reference samples of the second group of reference samples of the first reference block and the spatially outermost reference samples of the second group of reference samples of the second reference block.

In some aspects, the cost value may be derived as a sum of difference values between reference samples of the first and second reference blocks, difference values between reference samples of the first group of reference samples of the first reference block and reference samples of the first group of reference samples of the second reference block may be weighted with a first weighting factor, and difference values between reference samples of the second group of reference samples of the first reference block and reference samples of the second group of reference samples of the second reference block may be weighted with a second weighting factor that is different than the first weighting factor. In some aspects, the second weighting factor may be larger than the first weighting factor. In some aspects, the first weighting factor may be lower than the second weighting factor.

Another aspect of the invention may provide an apparatus for processing (e.g., encoding or decoding) a first structure within a picture in a video sequence. The apparatus may be adapted to, for a second structure within the first structure, determine an initial motion vector (MV) and MV candidates. The apparatus may be adapted to, for each of the MV candidates, use the MV candidate to derive a first reference block and a second reference block. A size of the first and second reference blocks may not be equal to a size of the second structure. The apparatus may be adapted to derive a cost value based on samples from the first and second reference blocks. The apparatus may be adapted to use the cost values from the MV candidates to derive a best MV candidate. The apparatus may be adapted to use the best MV candidate to derive prediction samples for the second structure.

Yet another aspect of the invention may provide a computer program including instructions for adapting an apparatus to perform any of the above methods. Still another aspect of the invention may provide a carrier containing the computer program, and the carrier may be one of an electronic signal, optical signal, radio signal, or compute readable storage medium.

Yet another aspect of the invention may provide an apparatus. The apparatus may include processing circuitry and a memory. The memory may contain instructions executable by said processing circuitry, and the apparatus may be operative to perform any of the above methods.

Still another aspect of the invention may provide an apparatus adapted to perform any of the above methods.

Yet another aspect of the invention may provide any combination of the aspects set forth above.

BRIEF DESCRIPTION OF THE DRAWINGS

The accompanying drawings, which are incorporated herein and form part of the specification, illustrate various embodiments.

FIG. 15A illustrate subblocks according to some aspects.

FIG. 15B illustrate reference blocks according to some aspects.

FIG. 15C illustrates an example of the furthest spatial distance between the reference blocks according to some aspects.

FIG. 15D illustrates an overlapped region between reference blocks according to some aspects.

FIG. 16 is a flow chart illustrating a process according to some embodiments.

DETAILED DESCRIPTION

Figure 1:
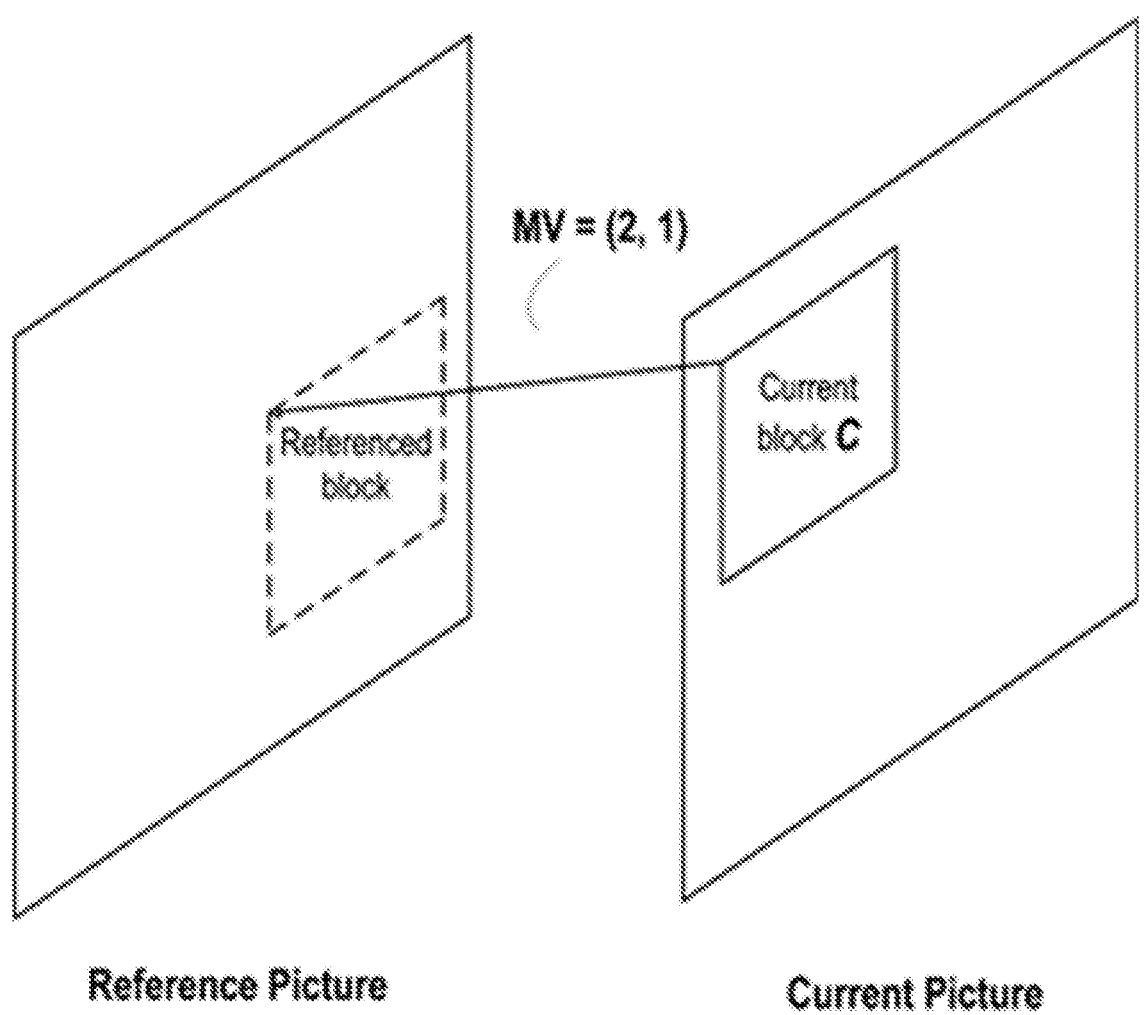
FIG. 1 shows an example of a motion vector (MV) for a current block C.
Figure 2:
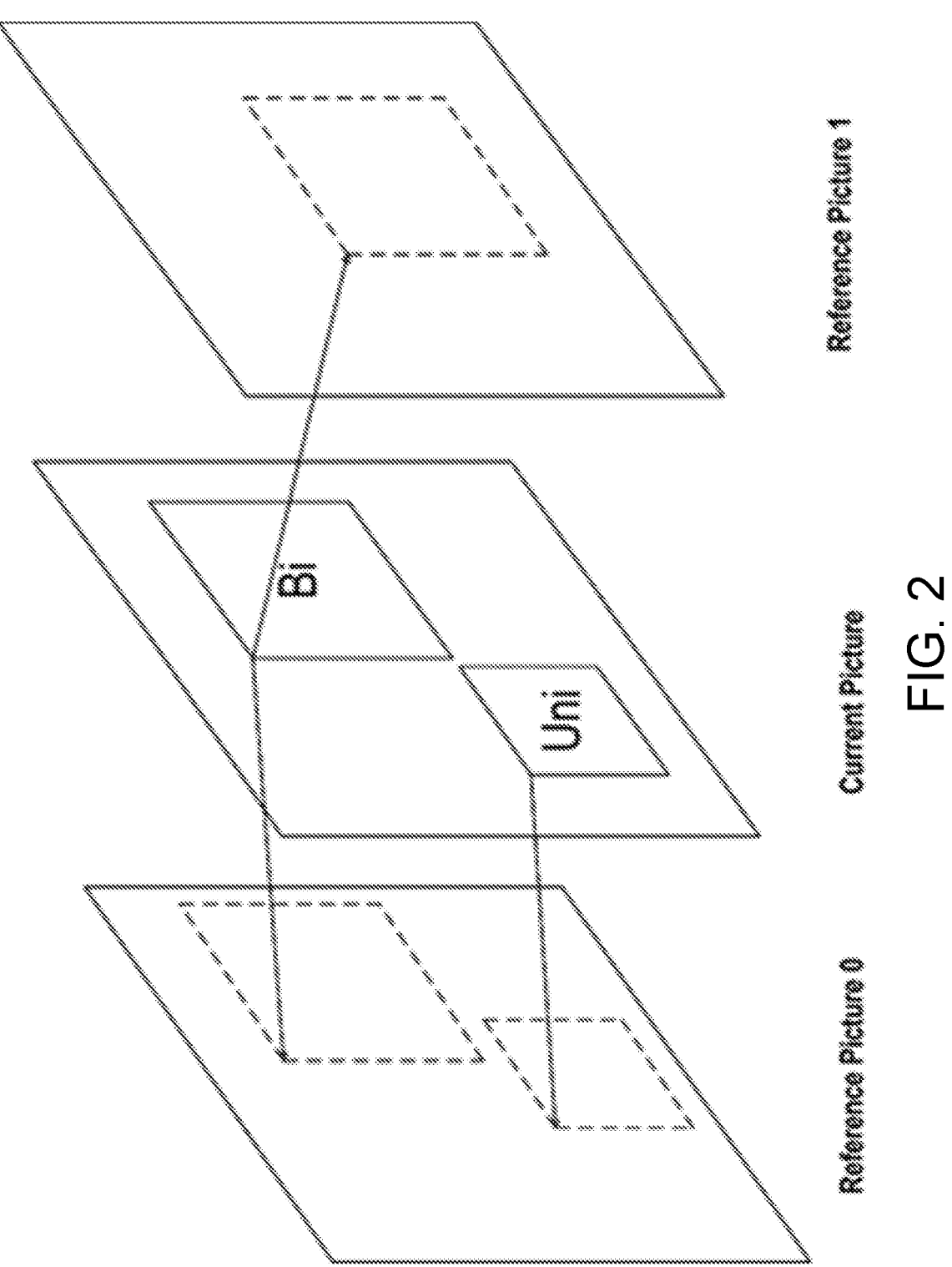
FIG. 2 shows an example of Uni- and Bi-inter prediction.
Figure 3:
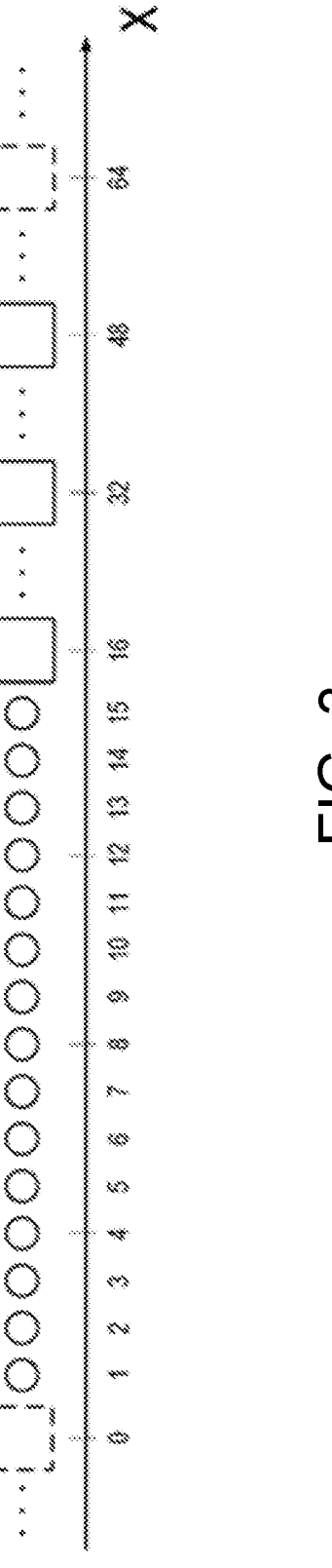
FIG. 3 shows motion vector sample positions in the horizontal (x) dimension.
Figure 4:
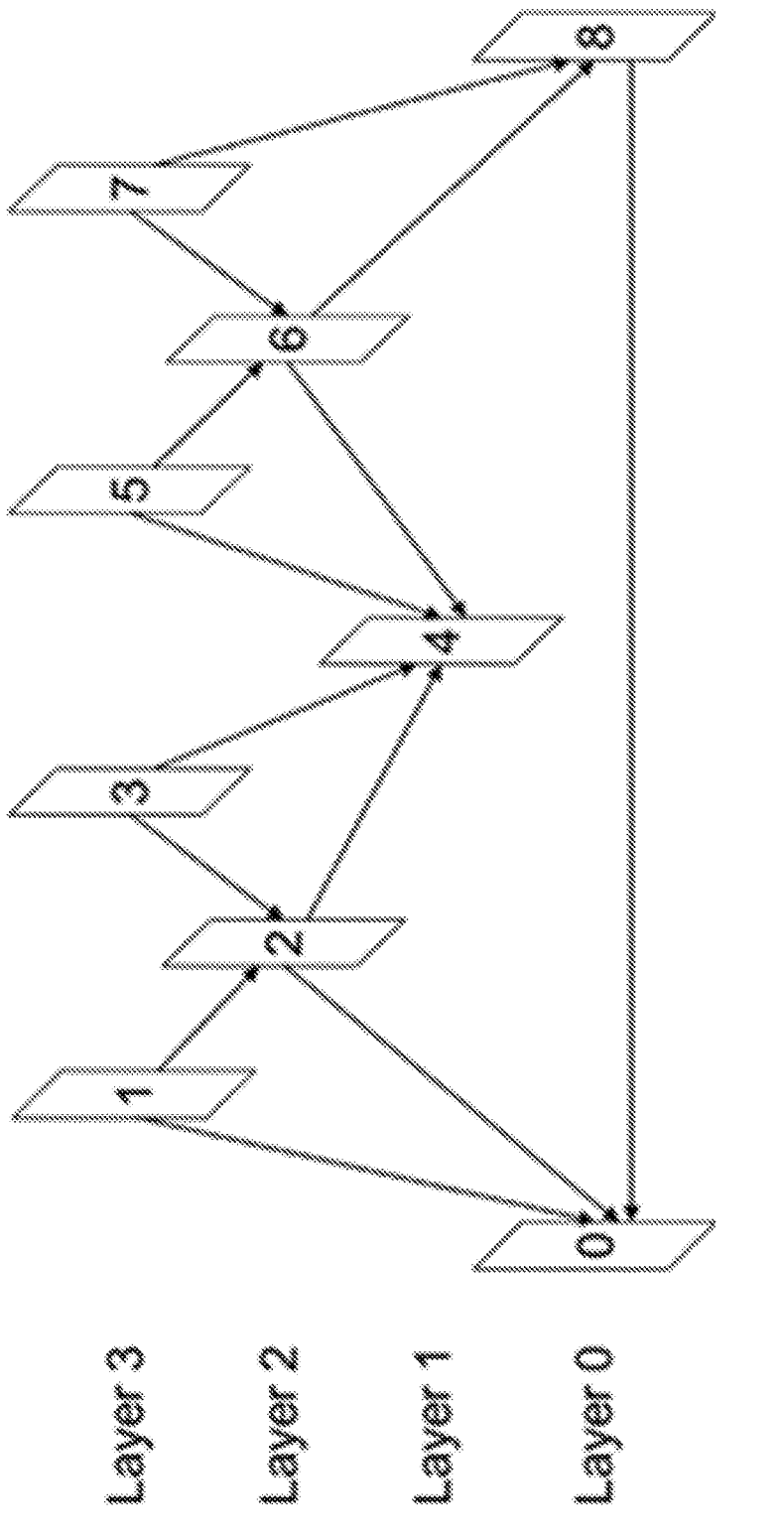
FIG. 4 shows an example of a four-layer bi-directional group of pictures (B-GOP) structure using two reference pictures per picture.
Figure 5:
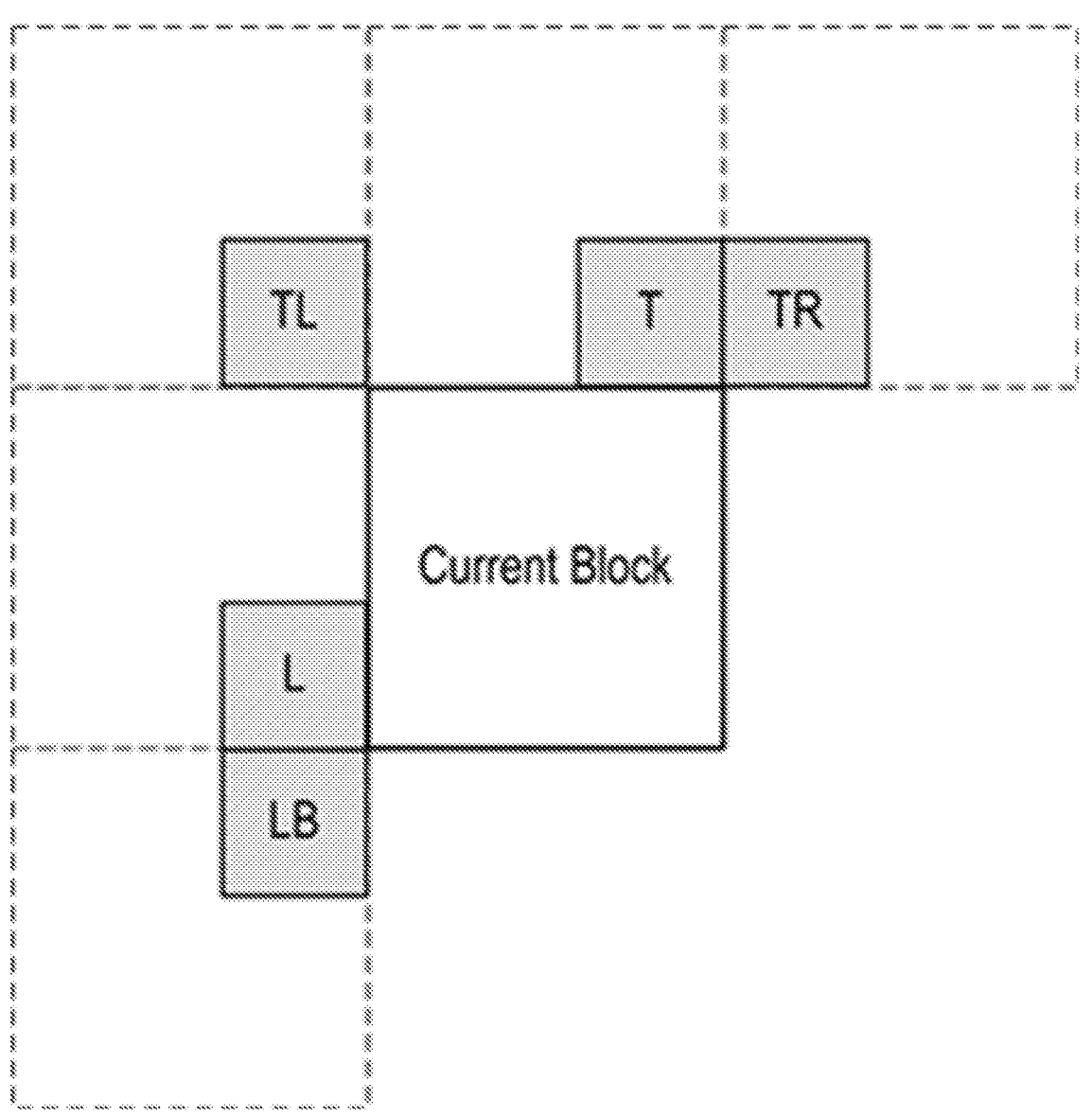
FIG. 5 shows possible spatial blocks for fetching neighboring motion information.
Figure 6:
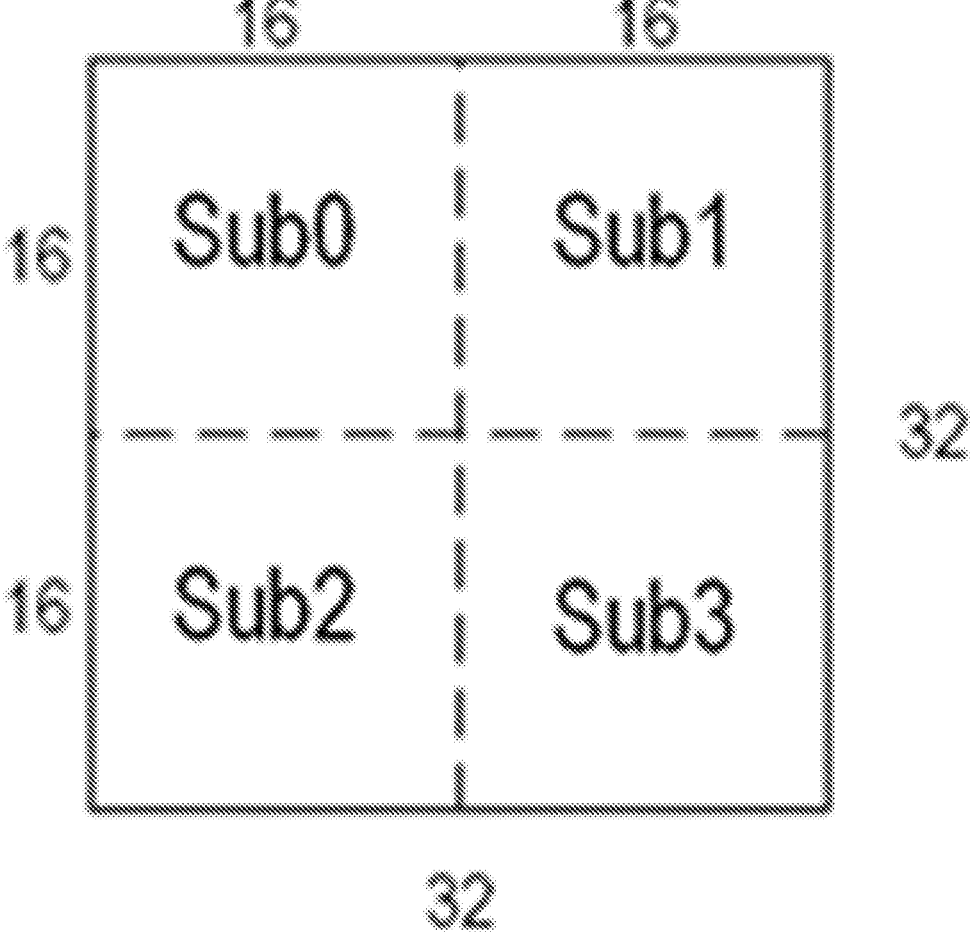
FIG. 6 shows a 32×32 block with four 16×16 subblocks.
Figure 7:
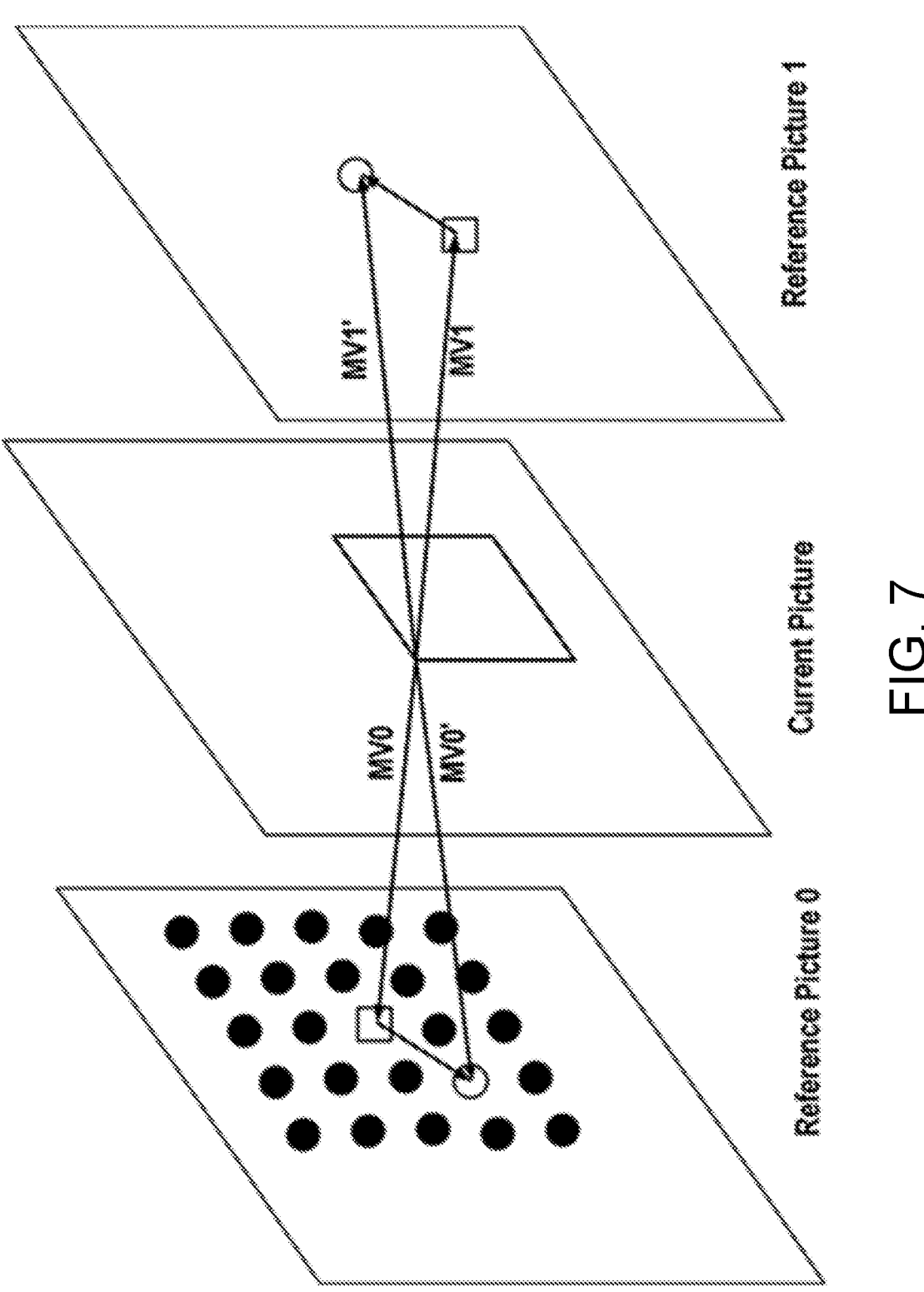
FIG. 7 illustrates an example of initial motion vectors and search window.
Figure 8:
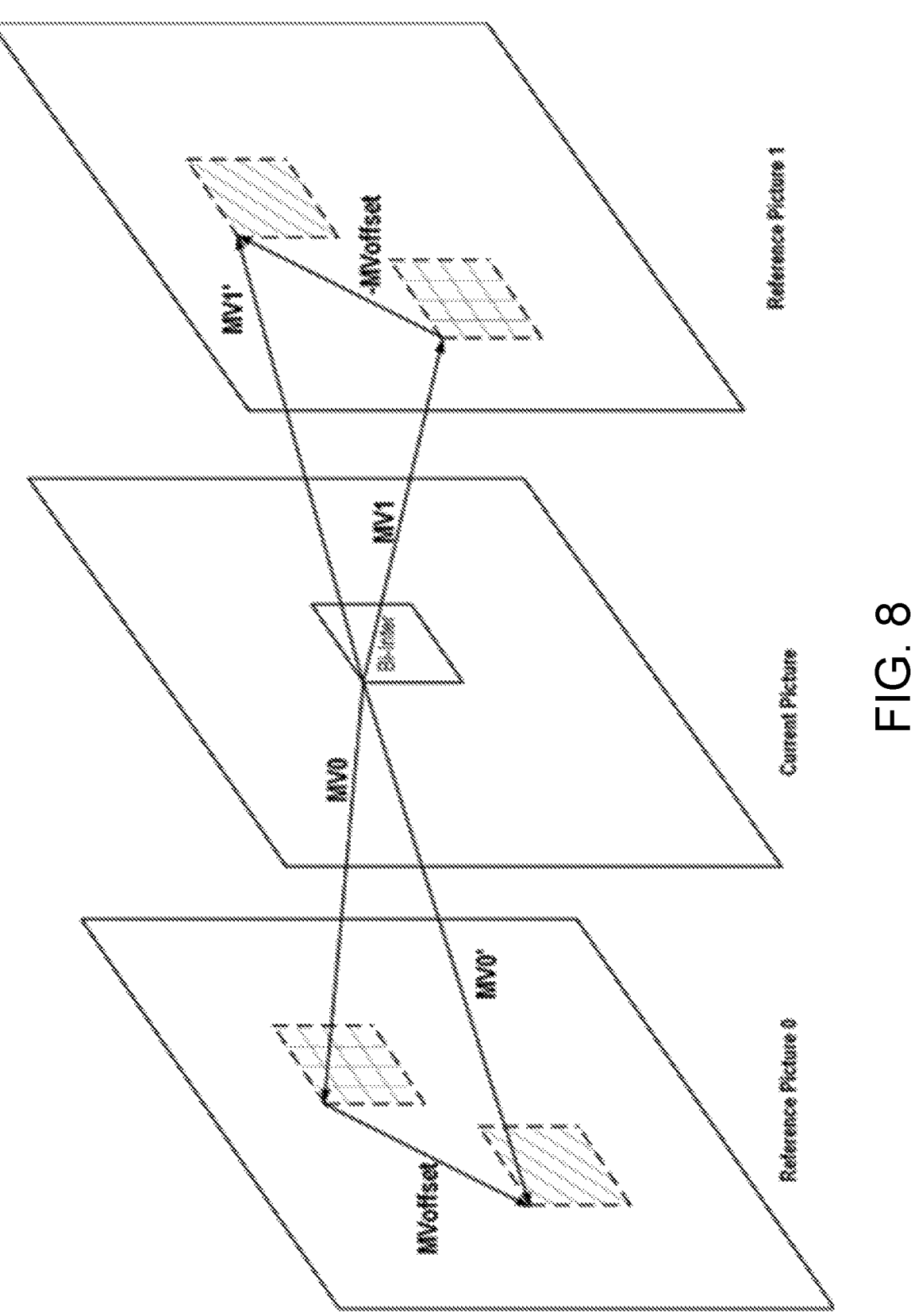
FIG. 8 illustrates an example of initial MVs, MVoffset, and refined MVs.
Figure 9A:
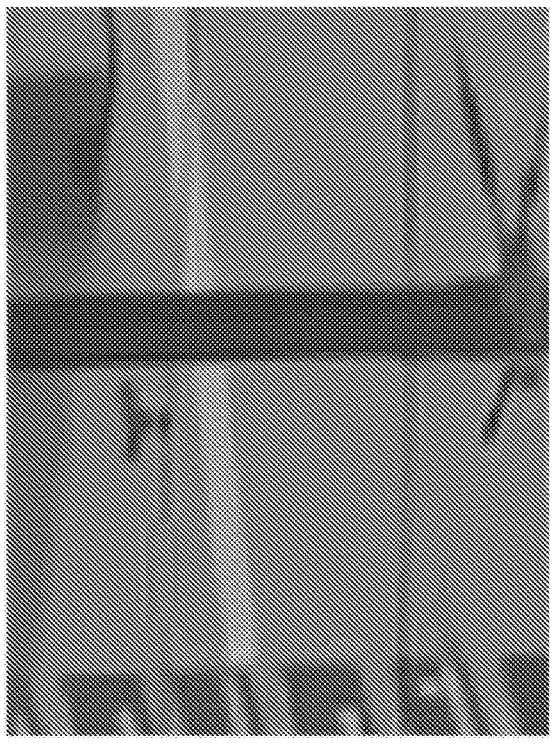
FIGS. 9A and 9B show examples of problematic areas from reconstructed pictures using an existing decoder-side motion vector refinement (DMVR) scheme.
Figure 9B:
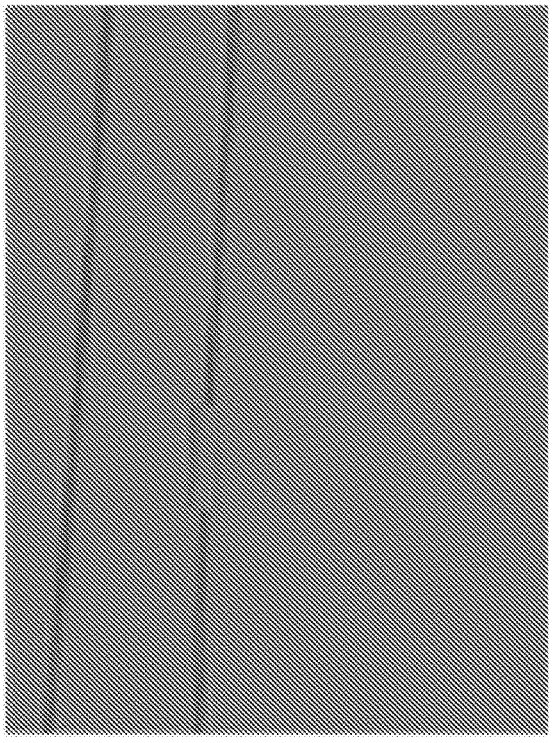
Figure 10B:
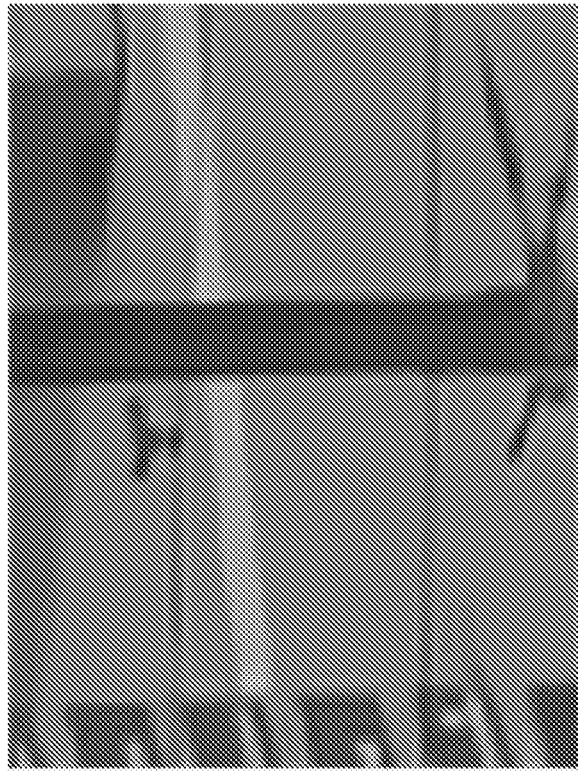
FIGS. 10A and 10B show examples of reconstructed pictures using a decoder-side motion vector refinement (DMVR) scheme according to some aspects.
Figure 10A:
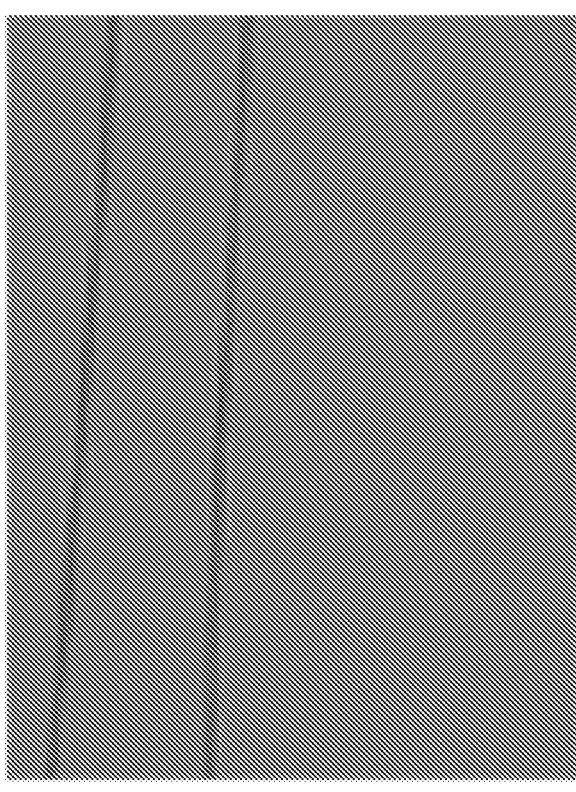
Figure 11:
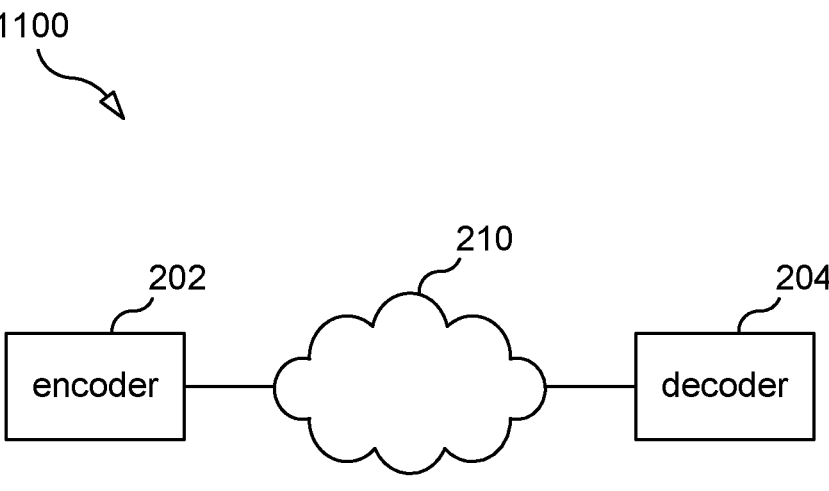
FIG. 11 illustrates a system comprising an encoder and a decoder according to some aspects.

FIG. 11 illustrates a system 1100 according to an example embodiment. System 1100 includes an encoder 202 and a decoder 204. In the example shown, decoder 204 receives, via a network 210 (e.g., the Internet or other network), encoded images produced by encoder 202.

Figure 12:
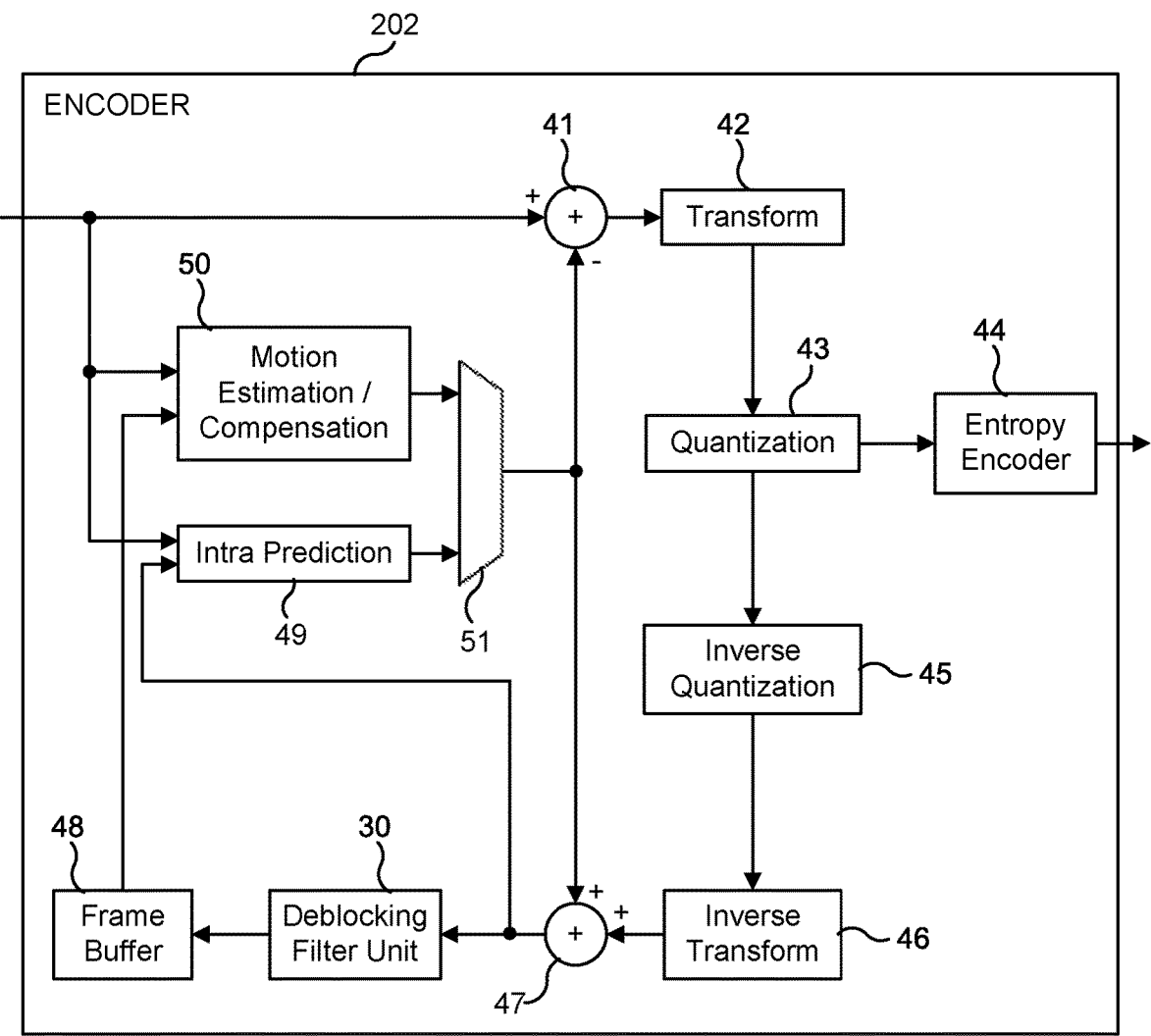
FIG. 12 illustrates an example encoder according to some aspects.

FIG. 12 is a schematic block diagram of the encoder 202 according to some aspects. In some aspects, the encoder 202 may be for encoding a block of pixel values in a video frame (e.g., picture) of a video sequence according to some embodiments. In some aspects, as shown in FIG. 12, the encoder 202 may include a motion estimator 50 that predicts a current block by performing a motion estimation from an already provided block in the same frame or in a previous frame. The result of the motion estimation may be a motion or displacement vector associated with the reference block, in the case of inter prediction. In some aspects, the motion compensator 50 may utilize the motion vector for outputting an inter prediction of the block. In some aspects, the encoder 202 may include an intra predictor 49 that computes an intra prediction of the current block. In some aspects, the encoder 202 may include a selector 51 that receives outputs from the motion estimator/compensator 50 and the intra predictor 49 as inputs and either selects intra prediction or inter predic-tion for the current block. In some aspects, the output from the selector 51 may be input to an error calculator in the form of an adder 41 that also receives the pixel values of the current block. In some aspects, the adder 41 may calculate and output a residual error as the difference in pixel values between the block and its prediction. In some aspects, the encoder 202 may include a transformer 42 that transforms the error, such as by a discrete cosine transform. In some aspects, the encoder 202 may include a quantizer 43 that quantizes the transformed error. In some aspects, the encoder 202 may include an encoder 44, such as an entropy encoder, that codes the quantized error. In inter coding, the estimated motion vector may also be brought to the encoder 44 for generating the coded representation of the current block. In some aspects, the encoder 202 may include an inverse quantizer 45 and an inverse transformer 46 that receive the transformed and quantized residual error for the current block and retrieve the original residual error. In some aspects, the encoder may include an adder 47 that adds the original residual error to the block prediction output from the motion compensator 50 or the intra predictor 49 to create a reference block that can be used in the prediction and coding of a next block. In some aspects, the encoder 202 may include a deblocking filter unit 30 that processes the new reference block in order to perform deblocking filtering to combat any blocking artifact. In some aspects, the encoder 202 may include a frame buffer 48 that temporarily stores the processed new reference block, and it may be available to the intra predictor 49 and/or the motion estima-tor/compensator 50.

Figure 13:
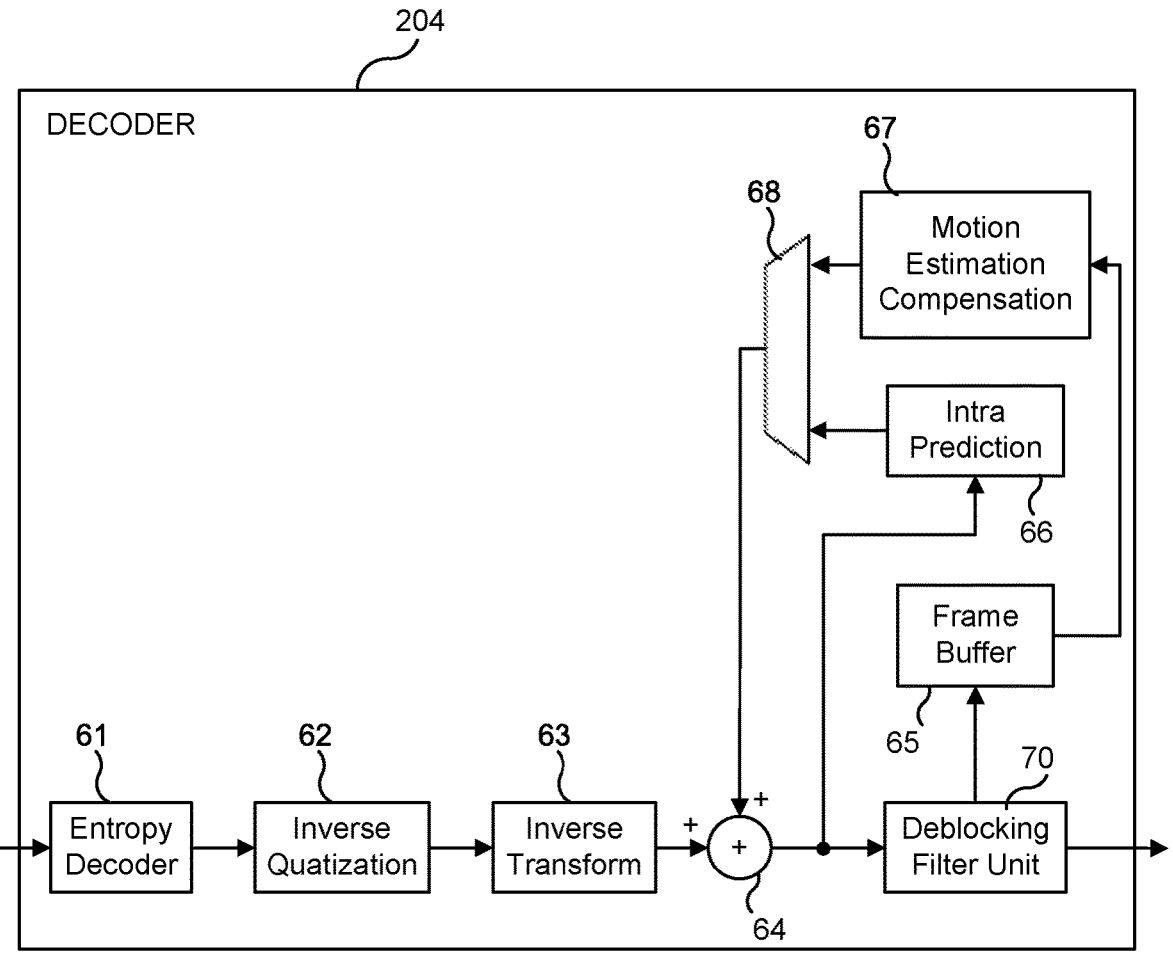
FIG. 13 illustrates an example decoder according to some aspects.

FIG. 13 is a schematic block diagram of the decoder 204 according to some aspects. In some aspects, as shown in FIG. 13, the decoder 204 may include a decoder 61, such as an entropy decoder, for decoding an encoded representation of a block to get a set of quantized and transformed residual errors. In some aspects, the decoder 204 may include an inverse quantizer 62 that dequantizes the residual errors and an inverse transformer 63 and inverse transforms the residual errors to get a set of residual errors. In some aspects, the decoder 204 may include an adder 64 that adds the residual errors to the pixel values of a reference block. In some aspects, the decoder 204 may include a motion esti-mator/compensator 67 and intra predictor 66 that each determine a reference block, and a selector 48 selects one of the reference blocks depending on whether inter or intra prediction is performed. In some aspects, the selector 68 may be interconnected to the adder 64, the motion estimator/compensator 67, and the intra predictor 66. In some aspects, the resulting decoded block output form the adder QQ464 may be input to a deblocking filter unit 70 in order to deblocking filter any blocking artifacts. In some aspects, the filtered block may be output from the decoder 204 and may be provided to a frame buffer 65 for temporary storage so that the filtered block may be used as a reference block for a subsequent block to be decoded. In some aspects, the frame buffer 65 may be connected to the motion estimator/compensator 67 to make the stored blocks of pixels available to the motion estimator/compensator 67. In some aspects, the output from the adder 64 may preferably be also input to the intra predictor 66 to be used as an unfiltered reference block.

Aspects of the invention apply to the encoder 202 and/or the decoder 204. Aspects of the invention apply to the decoder-side motion vector refinement (DMVR) method in Versatile Video Coding (VVC) but are not limited thereto. Aspects of the invention may be applied for other subblock-based motion refinement methods. The term "subblock based" means that the motion refinement is carried out on subblock basis (e.g., a basis or a grid that has a size that is not greater than the block size).

In some aspects, for encoding or decoding a current block within a current picture inside a video sequence, an encoder 202 or decoder 204 may implement one or more of the following steps. First, the encoder 202 or decoder 204 may split the current block into a set of subblocks such that the accumulated number of samples from all the subblocks are the same as the number of samples of the current block. In some aspects, the number of subblocks in the subblock set may be larger than or equal to 1. In some aspects, the number of subblocks in the subblock set may be larger than 1. In some alternative aspects, the number of subblocks in the subblock set may equal to 1. In such a case, the size of the subblock may be the same as the current block.

Second, for a current subblock within the subblock set that has width=sbW and height=sbH, the encoder 202 or decoder 204 (a) determine an initial motion vector (MV) and a set of MV candidates, (b) for each MV candidate mvCand in the MV candidate set: (i) derive a pair of reference blocks (e.g., refBlk0, refBlk1) with width=refW and height=refH using the MV candidate mvCand and (ii) derive a cost value costV based on the samples from the pair of reference blocks (refBlk0, refBlk1), (c) derive a best MV candidate mvBest based on the cost values from all the MV candidates, and (d) derive prediction samples for the current subblock based on the best MV candidate mvBest. In some aspects, the size of the reference blocks may fulfil at least one of the following criteria: (i) the reference blocks' width refW is not equal to the current subblock's width sbW, and (ii) the reference blocks' height refH is not equal to the current subblock's height sbH. In some aspects, the reference block width refW is greater than the subblock's width sbW, and/or the refer-ence block height refH is greater than the subblock's height sbH.

In some aspects, deriving each reference block of the pair of reference blocks (refBlk0, refBlk1) may include: (i) deriving a first group of reference samples (rsGroup1) and (ii) deriving a second group of reference samples (rs-Group2). In some aspects, the first group of reference samples (rsGroup1) may be a block of reference samples with a size equal to the current subblock size (e.g., width=sbW and height=sbH) based on the MV candidate mvCand. In some aspects, the second group of reference samples (rsGroup2) may include the remaining reference samples that are spatially adjacent to the first group rsGroup1 based on the MV candidate mvCand.

Figure 14C:
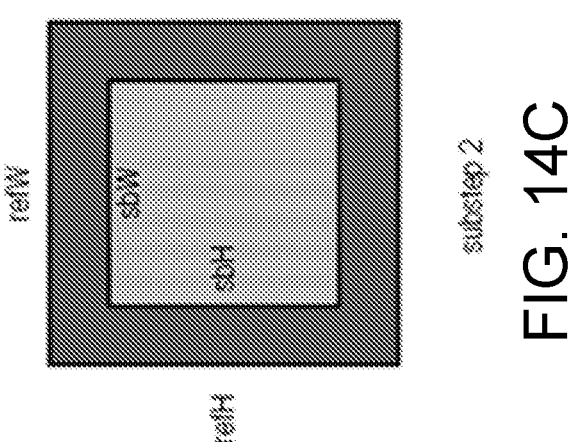
FIGS. 14A-14C illustrate an example of the reference block derivation process according to some aspects.
Figure 14B:
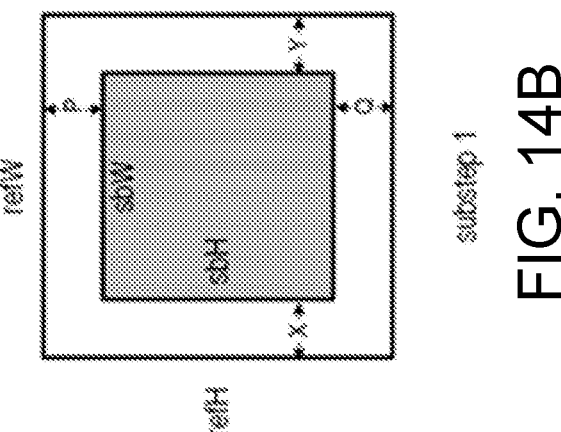
Figure 14A:
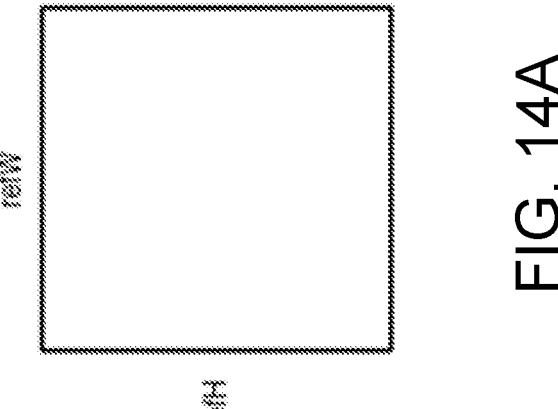

FIGS. 14A-14C illustrate an example of the reference block derivation process according to some aspects. FIG. 14A illustrates a reference block having a width equal to refW and a height equal to refH. FIG. 14B illustrates a first group of reference samples (rsGroup1) having a size equal to the current subblock size. That is, the width and height of rsGroup1 may equal to the width sbW and height sbH, respectively, of the current subblock. In FIG. 14B, P represents the number of samples between the top boundary of the first block of reference samples (rsGroup1) and the reference block, Q represents the number of samples between the bottom boundary of the first block and the reference block, X represents the number of samples between the left boundary of the first block and the reference block, and Y represents the number of samples between the right boundary of the first block and the reference block. FIG. 14C illustrates a second group of reference samples (rsGroup2). In some aspects, the second group of reference samples (rsGroup2) may include the reference samples of the reference block that are not in the first group of reference samples (rsGroup1). In FIG. 14C, the first and second groups of reference samples (rsGroup1 and rsGroup2) are shown with light-grey and dark-grey, respectively.

In some aspects, P, Q, X, and Y (as shown in FIG. 14B) may be equal to or greater than a threshold T. In some aspects, the threshold T may depend on the maximum MV difference maxMVD (in x or y component) between the initial MV and the set of MV candidates. In some aspects, the threshold T may be larger than the maxMvD. For example, in some aspects, the threshold T may have a value equal to 2 times the maxMVD.

In some aspects, T may have a value larger than maxMVD for the following reasons. FIG. 15A illustrates an example of two adjacent subblocks subA, subB. FIG. 15B illustrates an example of reference blocks refBlk0A and refBlk0B corresponding to the initial MVs. For simplicity, only the reference blocks from the L0 reference list are shown in FIG. 15B (i.e., the reference block refBlk0A corresponds to the L0 reference block for subblock subA, and the reference block refBlk0B corresponds to the L0 reference block for subblock subB). In some aspects, as shown in FIGS. 15A and 15B, the reference blocks refBlk0A and refBlk0B may have the same size as the subblocks subA and subB.

Considering the maximum MvD, FIG. 15C shows an example of the furthest spatial distance between the refBlk0A and refBlk0B. In the natural video, the correlation between samples generally decreases when the spatial distance increases. Accordingly, the refined MVs for subblocks subA and subB are generally less correlated if the reference blocks refBlk0A and refBlk0B are further away from each other.

In some aspects, to address this problem, the reference block sizes may be increased such that an overlapped region is introduced. For example, as shown in FIG. 15D, if (i) the reference blocks have a width equal to or greater than the subblock width sbW plus two times the threshold T, (ii) the reference blocks have a height equal to or greater than the subblock height sbH plus two times the threshold T, and (iii) the threshold T is larger than the maxMvD, then an overlapped region is guaranteed even when the reference blocks are furthest away from each other. In some aspects, the introduced overlapped region may help to increase the correlation or consistency between the final selected MVs for subblocks subA and subB.

In some aspects, when the maximum MV difference in x or y component between the initial MV and the set of MV candidates is 2 in integer sample, the threshold T may, for example, be set to 4, and P=Q=X=Y=4.

In some alternative aspects, instead of the threshold T being larger than the maxMvD, the threshold T may be set to be equal to maxMvD. In these aspects, there may be no overlapped region, but the regions may touch. In some circumstances, this may be sufficient to obtain consistent motion vectors.

In some aspects, P, Q, X, and Y (as shown in FIG. 14B) may all have the same value K. In some alternative aspects, the value of P, Q, X, and/or Y may be different for each subblock. For example, in some aspects in which P, Q, X, and/or Y may be different, for the most top-left subblock within the block, the P and X (e.g., the extended reference sample number for top and left side) may have a larger value than Q and/or Y. P and X may have a larger value because, for the most top-left subblock, the subblock's left and top boundary are block boundaries, and having a larger overlapped region may be desirable to further reduce the chance of block boundaries being visible. For another example, in some aspects in which P, Q, X, and/or Y may be different, for a subblock that has any side (e.g., left, right, bottom or top) that is a block boundary, the corresponding value for P, Q, X, or Y (e.g., the extended reference sample numbers for that side) may have a larger value than the corresponding value for a side that is not a block boundary.

In some aspects, the first group of reference samples rsGroup1 may be derived using a first interpolation filter, and the second group of reference samples rsGroup2 may be derived using a second interpolation filter. In some aspects, the first interpolation filter may be longer (e.g., in terms of taps) than the second interpolation filter.

In some aspects, the second group of reference samples rsGroup2 may be derived using a rounded version of the MV candidate mvCand. In some aspects, the rounded version of the MV candidate mvCand may be, for example, that the mvCand gets rounded to the integer sample position.

Some alternative aspects may apply to refining blocks within a larger structure (e.g., instead of refining subblocks within a block). In some aspects, the larger structure may be a coding tree unit (CTU) or part of a CTU. In some aspects, the CTU (or part of the CTU) may contain multiple blocks. In some aspects, the larger structure may be referred to herein as a superblock. In some aspects, a current superblock may be within a current picture inside a video sequence. In some aspects, the superblock may be divided into two or more blocks. In some aspects, for encoding or decoding the current superblock, an encoder 202 or decoder 204 may, for a current block within the superblock having a width=sbW and height=sbH, the encoder 202 or decoder 204 (*a*) determine an initial motion vector (MV) and a set of MV candidates, (b) for each MV candidate mvCand in the MV candidate set: (i) derive a pair of reference blocks (e.g., refBlk0, refBlk1) with width=refW and height=refH using the MV candidate mvCand and (ii) derive a cost value costV based on the samples from the pair of reference blocks (refBlk0, refBlk1), (c) derive a best MV candidate mvBest based on the cost values from all the MV candidates, and (d) derive prediction samples for the current subblock based on the best MV candidate mvBest. In some aspects, the size of the reference blocks may fulfil at least one of the following criteria: (i) the reference blocks' width refW is not equal to the current block's width sbW, and (ii) the reference blocks' height refH is not equal to the current block's height sbH.

In some aspects (e.g., aspects that refine subblocks within a block or aspects that refine blocks within a superblock), the cost value costV may be derived as a sum of difference values between the samples of the reference blocks refBlk0, refBlk1. That is, costV=$\Sigma_{i,j}$diffV(i, j) where diffV(i, j) is the difference value at sample position (i,j). In some aspects, diffV(i, j) may be calculated, for example, as the absolute sample difference (e.g., diffV(i, j)=|refBlk0(i, j)−refBlk1(i, j)|). In some alternative aspects, diffV(i, j) may be calculated, for example, as the squared sample difference (e.g., diffV(i, j)=(refBlk0(i,j)−refBlk1(i,j))²).

In some aspects, the cost value costV may be calculated based on difference values from a subset of the first group rsGroup1 or a subset of the second group rsGroup2. In some aspects, the cost value costV may be calculated, for example, based on all the difference values from the samples in the first group and difference values from every other sample in the second group. In some alternative aspects, the cost value costV may be, for example, based on all the difference values from the samples in the first group and difference values from the spatially outermost samples in the second group.

In some aspects, when calculating the cost value costV, the difference value from the first group rsGroup1 or the second group rsGroup2 may be assigned with a different weighting factor (e.g., costV=$\Sigma_{i,j \in rsGroup1}$W1*diffV(i,j)+$\Sigma_{i,j \in rsGroup2}$W2*diffV(i,j)). In some aspects, a larger weighting factor may be assigned for the second group rsGroup2 than the weighting factor for the first group rsGroup1 (e.g., W1=1 and W2=1.25). In some aspects, a lower weighting factor may be assigned for the first group rsGroup1 than the weighting factor for the second group rsGroup2 (e.g., W1=0.75 and W2=1).

FIG. 16 illustrates a process 1600 for processing (e.g., encoding or decoding) a first structure within a picture in a video sequence according to some aspects. In some aspects, the first structure may be a block. In some alternative aspects, the first structure may be a superblock (e.g., a coding tree unit (CTU) or part of a CTU) including multiple blocks. In some aspects, the encoder 202 may perform some or all of the steps of the process 1600. In some alterative aspects, the decoder 204 may perform some or all of the steps of the process 1600.

In some aspects, the process 1600 may include a step 1604 of, for a second structure within the first structure, determining an initial motion vector (MV) and MV candidates. In some aspects in which the first structure is a block, the second structure may be a subblock of the block. In some aspects in which the first structure is a superblock containing two or blocks (e.g., the superblock may be divided into two or more blocks), the second structure may be a block of the superblock.

In some aspects, the process 1600 may include a step 1606 of, for each MV candidate (e.g., mvCand) of the MV candidates, using the MV candidate to derive a first reference block (e.g., refBlk0) and a second reference block (e.g., refBlk1). In some aspects, as shown in FIGS. 14B and 14C, a size of the first and second reference blocks may not be equal to a size of the second structure. In some aspects, as shown in FIGS. 14B and 14C, a height (e.g., refH) of the first and second reference blocks may not be equal to a height (e.g., sbH) of the second structure, and/or a width (e.g., refW) of the first and second reference blocks may not be equal to a width (e.g., sbW) of the second structure. In some aspects, as shown in FIGS. 14B and 14C, a height (e.g., refH) of the first and second reference blocks may be greater than a height (e.g., sbH) of the second structure, and/or a width (e.g., refW) of the first and second reference blocks may be greater than a width (e.g., sbW) of the second structure.

In some aspects, using the MV candidate to derive the first and second reference blocks in step 1606 may include, for each of the first and second reference blocks, deriving first and second groups of reference samples (e.g., rsGroup1 and rsGroup2) based on the MV candidate. In some aspects, the first group of reference samples may be a block of reference samples having a width and a height equal to a width (e.g., sbW) and a height (e.g., sbH), respectively, of the second structure. In some aspects, the second group of reference samples may include the reference samples of the reference block that are not in the first group of reference samples.

In some aspects, as shown in FIG. 14B, the reference block may include P samples between a top boundary of the first group of reference samples and a top boundary of the reference block, Q samples between a bottom boundary of the first group of reference samples and a bottom boundary of the reference block, X samples between a left boundary of the first group of reference samples and a left boundary of the reference block, and Y samples between a right boundary of the first group of reference samples and a right boundary of the reference block. P, Q, X, and Y may be numbers, and at least one of P, Q, X, and Y may be a non-zero number.

In some aspects, as shown in FIG. 15D, P, Q, X, and Y may be greater than or equal to a threshold T that depends on a maximum MV difference in x or y component between the initial MV and the MV candidates. In some aspects, as shown in FIG. 15D, the threshold T may be greater than the maximum MV difference. In some aspects, the threshold T may be equal to two times the maximum MV difference. In some alternative aspects, the threshold T may be equal to the maximum MV difference. In some aspects, the maximum MV difference may be 2 in integer sample, the threshold T may be 4, and P, Q, X, and Y may be equal to 4.

In some aspects, P, Q, X, and Y may be equal. In some aspects, one or more of P, Q, X, and Y may be different from another of P, Q, X, and Y. In some aspects, one or more of P, Q, X, and Y may correspond to a side of the second structure that is at a boundary of the first structure and is larger than another of P, Q, X, and Y that does not correspond to a side of the second structure that is at a boundary of the first structure.

In some aspects, deriving the first and second groups of reference samples based on the MV candidate may include using a first interpolation filter to derive the first group of reference samples and using a second interpolation filter to derive the second group of reference samples, and the first and second interpolation filters are different. In some aspects, the first interpolation filter may be longer than the second interpolation filter.

In some aspects, deriving the second group of reference samples based on the MV candidate may include using a rounded version of the MV candidate. In some aspects, the rounded version of the MV candidate may be the MV candidate rounded to an integer sample position.

In some aspects, as shown in FIG. 15D, the first reference block for the second structure may overlap a first reference block of another second structure of the first structure. In some aspects, the second reference block for the second structure may overlap a second reference block of the other second structure. In some alternative aspects, the first reference block for the second structure may touch but does not overlap a first reference block for another second structure of the first structure. In some aspects, the second reference block for the second structure may touch but does not overlap a second reference block for the other second structure.

In some aspects, the process 1600 may include a step 1608 of deriving a cost value (e.g., costV) based on samples from the first and second reference blocks. In some aspects, the cost value may be derived as a sum of difference values between samples of the first and second reference blocks.

That is, costV=Z diffV(i, j) where diffV(i, j) is the difference value at sample position (i, j). In some aspects, the difference values may be absolute sample difference values (e.g., diffV(i,j)=|refBlk0(i,j)−refBlk1(i, j)|). In some aspects, the difference values may be squared sample difference values (e.g., diffV(i, j)=(refBlk0(i, j)−refBlk1(i, j))$^2$).

In some aspects, the difference values may include (a) difference values between a subset of the first group of reference samples of the first reference block and a subset of the first group of reference samples of the second reference block and/or (b) difference values between a subset of the second group of reference samples of the first reference block and a subset of the second group of reference samples of the second reference block. In some aspects, the difference values may include (i) difference values between all reference samples of the first group of reference samples of the first reference block and all reference samples of the first group of reference samples of the second reference block and (ii) difference values between every other reference sample of the second group of reference samples of the first reference block and every other reference sample of the second group of reference samples of the second reference block. In some aspects, the difference values may include (i) difference values between all reference samples of the first group of reference samples of the first reference block and all reference samples of the first group of reference samples of the second reference block and (ii) difference values between the spatially outermost reference samples of the second group of reference samples of the first reference block and the spatially outermost reference samples of the second group of reference samples of the second reference block.

In some aspects, difference values between reference samples of the first group of reference samples of the first reference block and reference samples of the first group of reference samples of the second reference block may be weighted with a first weighting factor (e.g., W1), and difference values between reference samples of the second group of reference samples of the first reference block and reference samples of the second group of reference samples of the second reference block may be weighted with a second weighting factor (e.g., W2) that is different than the first weighting factor (e.g., costV=$\Sigma_{i,j\in rsGroup1}$W1*diffV(i, j)+$\Sigma_{i,j\in rsGroup2}$W2*diffV(i, j)). In some aspects, the second weighting factor may be larger than the first weighting factor (e.g., W1 may be equal to 1, and W2 may be equal to 1.25). In some aspects, the first weighting factor may be lower than the second weighting factor (e.g., W1 may be equal to 0.75, and W2 may be equal to 1).

In some aspects, the process 1600 may include a step 1610 of using the cost values from the MV candidates to derive a best MV candidate (e.g., mvBest).

In some aspects, the process 1600 may include a step 1612 of using the best MV candidate to derive prediction samples for the second structure.

In some aspects (e.g., aspects in which the first structure is a block and the second structure is a subblock), the process 1600 may include an optional step 1602 of splitting the first structure (e.g., block) into n second structures (e.g., n subblocks), and n may be greater than or equal to 1. In some aspects, n may be greater than or equal to 2. In some aspects, an accumulated number of samples of the n second structures (e.g., subblocks) may be equal to the number of samples of the first structure (e.g., block).

Figure 17:
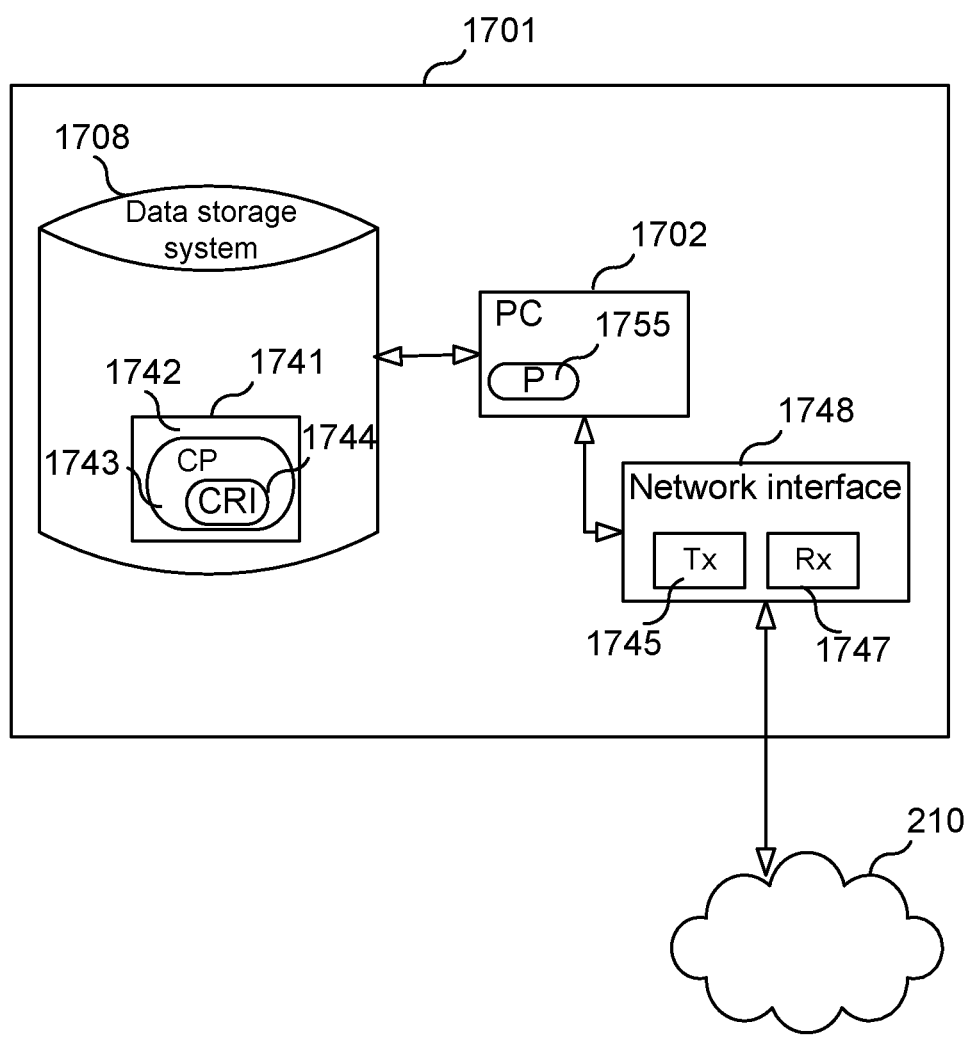
FIG. 17 is a block diagram of an apparatus according to one embodiment.

FIG. 17 is a block diagram of an apparatus 1701 for implementing the encoder 202 or the decoder 204 according to some aspects. That is, apparatus 1701 can be adapted to perform the methods disclosed herein. In aspects where the apparatus 1701 implements the encoder 202, the apparatus 1701 may be referred to as "encoding apparatus 1701," and, in aspects where the apparatus 1701 implements the decoder 204, the apparatus 1701 may be referred to as a "decoding apparatus 1701." As shown in FIG. 17, the apparatus 1701 may comprise: processing circuitry (PC) 1702, which may include one or more processors (P) 1755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1701 may be a distributed computing apparatus); at least one network interface 1748 comprising a transmitter (Tx) 1745 and a receiver (Rx) 1747 for enabling apparatus 1701 to transmit data to and receive data from other nodes connected to a network 110 (e.g., an Internet Protocol (IP) network) to which network interface 1748 is connected (directly or indirectly) (e.g., network interface 1748 may be wirelessly connected to the network 210, in which case network interface 1748 is connected to an antenna arrangement); and/or a storage unit (a.k.a., "data storage system") 1708, which may include one or more non-volatile storage devices and/or one or more volatile storage devices. In aspects where PC 1702 includes a programmable processor, a computer program product (CPP) 1741 may be provided. In some aspects, the CPP 1741 may include a computer readable medium (CRM) 1742 storing a computer program (CP) 1743 comprising computer readable instructions (CRI) 1744. The CRM 1742 may be a non-transitory computer readable medium, such as, magnetic media (e.g., a hard disk), optical media, memory devices (e.g., random access memory, flash memory), and the like. In some aspects, the CRI 1744 of computer program 1743 is configured such that when executed by PC 1702, the CRI causes apparatus 1701 to perform steps described herein (e.g., steps described herein with reference to the flow charts). In some other aspects, the apparatus 1701 may be configured to perform steps described herein without the need for code. That is, for example, PC 1702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for encoding or decoding a block within a picture in a video sequence, the method comprising:

for a subblock of the block, determining an initial motion vector (MV) and MV candidates;

for each of the MV candidates:

using the MV candidate to derive a first reference block and a second reference block, wherein a size of the first and second reference blocks is not equal to a size of the subblock of the block, and the first reference block for the subblock of the block touches but does not overlap a first reference block for another sub-block of the block; and deriving a cost value based on samples from the first and second reference blocks;

using the cost values from the MV candidates to derive a best MV candidate;

using the best MV candidate to derive prediction samples for the subblock of the block; and splitting the block into n subblocks, wherein n is greater than or equal to 1, and an accumulated number of samples of the n subblocks is equal to the number of samples of the block.

2. The method of claim 1, wherein a height of the first and second reference blocks is greater than a height of the subblock of the block, and/or a width of the first and second reference blocks is greater than a width of the subblock of the block.

3. The method of claim 1, wherein the second reference block for the subblock of the block touches but does not overlap a second reference block for the other subblock of the block.

4. The method of claim 1, wherein:

using the MV candidate to derive the first and second reference blocks comprises, for each of the first and second reference blocks, deriving first and second groups of reference samples based on the MV candidate;

the first group of reference samples is a block of reference samples having a width and a height equal to a width and a height, respectively, of the subblock of the block; and the second group of reference samples includes the reference samples of the reference block that are not in the first group of reference samples.

5. The method of claim 4, wherein deriving the first and second groups of reference samples based on the MV candidate comprises using a first interpolation filter to derive the first group of reference samples and using a second interpolation filter to derive the second group of reference samples, and the first interpolation filter is longer than the second interpolation filter.

6. The method of claim 4, wherein the cost value is derived as a sum of difference values between reference samples of the first and second reference blocks, and the difference values include (a) difference values between a subset of the first group of reference samples of the first reference block and a subset of the first group of reference samples of the second reference block and/or (b) difference values between a subset of the second group of reference samples of the first reference block and a subset of the second group of reference samples of the second reference block.

7. The method of claim 4, wherein:

the reference block includes P samples between a top boundary of the first group of reference samples and a top boundary of the reference block, Q samples between a bottom boundary of the first group of reference samples and a bottom boundary of the reference block, X samples between a left boundary of the first group of reference samples and a left boundary of the reference block, and Y samples between a right boundary of the first group of reference samples and a right boundary of the reference block;

P, Q, X, and Y are numbers;

at least one of P, Q, X, and Y is a non-zero number; and

P, Q, X, and Y are greater than or equal to a threshold T that depends on a maximum MV difference in x or y component between the initial MV and the MV candidates.

8. The method of claim 7, wherein the threshold T is greater than the maximum MV difference.

9. The method of claim 7, wherein the threshold T is equal to two times the maximum MV difference.

10. The method of claim 7, wherein the threshold T is equal to the maximum MV difference.

11. The method of claim 7, wherein one or more of P, Q, X, and Y corresponds to a side of the subblock of the block that is at a boundary of the block and is larger than another of P, Q, X, and Y that does not correspond to a side of the subblock of the block that is at a boundary of the block.

12. A non-transitory computer readable storage medium containing a computer program comprising instructions that, when executed by an apparatus, cause the apparatus to perform the method of claim 1.

13. An apparatus comprising processing circuitry and a storage unit, wherein the apparatus is configured to encode or decode a block within a picture in a video sequence, and the apparatus is configured to, in encoding or decoding the block:

for a subblock of the block, determine an initial motion vector (MV) and MV candidates;

for each of the MV candidates:

use the MV candidate to derive a first reference block and a second reference block, wherein a size of the first and second reference blocks is not equal to a size of the subblock of the block, and the first reference block for the subblock of the block touches but does not overlap a first reference block for another sub-block of the block; and derive a cost value based on samples from the first and second reference blocks;

use the cost values from the MV candidates to derive a best MV candidate;

use the best MV candidate to derive prediction samples for the subblock of the block; and split the block into n subblocks, wherein n is greater than or equal to 1, and an accumulated number of samples of the n subblocks is equal to the number of samples of the block.

14. A method for encoding or decoding a block within a picture in a video sequence, the method comprising:

for a subblock of the block, determining an initial motion vector (MV) and MV candidates;

for each of the MV candidates:

using the MV candidate to derive a first reference block and a second reference block, wherein:

a size of the first and second reference blocks is not equal to a size of the subblock of the block;

using the MV candidate to derive the first and second reference blocks comprises, for each of the first and second reference blocks, deriving first and second groups of reference samples based on the MV candidate;

the first group of reference samples is a block of reference samples having a width and a height equal to a width and a height, respectively, of the subblock of the block; and the second group of reference samples includes the reference samples of the reference block that are not in the first group of reference samples; and deriving a cost value based on samples from the first and second reference blocks, wherein the cost value is derived as a sum of difference values between reference samples of the first and second reference blocks, difference values between reference samples of the first group of reference samples of the first reference block and reference samples of the first group of reference samples of the second reference block are weighted with a first weighting factor, difference values between reference samples of the second group of reference samples of the first reference block and reference samples of the second group of reference samples of the second reference block are weighted with a second weighting factor, and the second weighting factor is larger than the first weighting factor;

using the cost values from the MV candidates to derive a best MV candidate;

using the best MV candidate to derive prediction samples for the subblock of the block; and splitting the block into n subblocks, wherein n is greater than or equal to 1, and an accumulated number of samples of the n subblocks is equal to the number of samples of the block.

15. The method of claim 14, wherein the first reference block for the subblock of the block touches but does not overlap a first reference block for another subblock of the block.

16. The method of claim 14, wherein the first reference block for the subblock of the block overlaps a first reference block of another subblock of the block.

17. The method of claim 16, wherein the second reference block for the subblock of the block overlaps a second reference block of the other subblock of the block.

18. An apparatus comprising processing circuitry and a storage unit, wherein the apparatus is configured to perform the method of claim 14.

19. A non-transitory computer readable storage medium containing a computer program comprising instructions that, when executed by an apparatus, cause the apparatus to perform the method of claim 14.

* * * * *